United States Patent
Ni et al.

(10) Patent No.: US 11,516,880 B2
(45) Date of Patent: Nov. 29, 2022

(54) SESSION PROCESSING METHOD AND APPARATUS

(71) Applicant: HUAWEI TECHNOLOGIES CO., LTD., Shenzhen (CN)

(72) Inventors: Hui Ni, Beijing (CN); Yongcui Li, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 16/745,201

(22) Filed: Jan. 16, 2020

(65) Prior Publication Data

US 2020/0154515 A1 May 14, 2020

Related U.S. Application Data

(63) Continuation of application No. PCT/CN2018/091202, filed on Jun. 14, 2018.

(30) Foreign Application Priority Data

Jul. 18, 2017 (CN) .......................... 201710585547.6

(51) Int. Cl.
| | |
|---|---|
| *H04W 80/10* | (2009.01) |
| *H04W 76/11* | (2018.01) |
| *H04W 48/18* | (2009.01) |
| *H04W 80/12* | (2009.01) |

(52) U.S. Cl.
CPC .......... *H04W 80/10* (2013.01); *H04W 48/18* (2013.01); *H04W 76/11* (2018.02); *H04W 80/12* (2013.01)

(58) Field of Classification Search
None
See application file for complete search history.

(56) References Cited

U.S. PATENT DOCUMENTS

| | | | |
|---|---|---|---|
| 2015/0063298 A1 | 3/2015 | Keller et al. | |
| 2015/0085824 A1 | 3/2015 | Gotou et al. | |
| 2018/0324577 A1* | 11/2018 | Faccin | H04W 76/27 |
| 2018/0324633 A1* | 11/2018 | Lee | H04L 47/2425 |
| 2019/0166647 A1* | 5/2019 | Velev | H04W 80/10 |

(Continued)

FOREIGN PATENT DOCUMENTS

| | | |
|---|---|---|
| CN | 101399768 A | 4/2009 |
| CN | 101605142 A | 12/2009 |

(Continued)

OTHER PUBLICATIONS

3GPP TSG SA WG2 Meeting #119,S2-171066:"Application-influenced SSC and UP management",Huawei, HiSilicon,Feb. 13-Feb. 17, 2017, Dubrovnik, Croatia,total 10 pages.

(Continued)

*Primary Examiner* — Saumit Shah
(74) *Attorney, Agent, or Firm* — Hauptman Ham, LLP

(57) ABSTRACT

A session processing method includes determining, by a processor that a first application is not associated with a session parameter of a first session when starting the first application. The method also includes transmitting data of the first application through the first session in response to obtaining indication information. The indication information indicates that the session parameter of the first session can satisfy a session parameter requirement of the first application.

13 Claims, 19 Drawing Sheets

(56) References Cited

U.S. PATENT DOCUMENTS

| | | | |
|---|---|---|---|
| 2020/0014762 A1* | 1/2020 | Li | .......................... H04L 67/12 |
| 2020/0092790 A1* | 3/2020 | Salkintzis | ............. H04W 76/10 |

FOREIGN PATENT DOCUMENTS

| | | |
|---|---|---|
| CN | 102611586 A | 7/2012 |
| CN | 104247507 A | 12/2014 |
| CN | 105471611 A | 4/2016 |
| CN | 106027600 A | 10/2016 |
| CN | 108011899 A | 5/2018 |

OTHER PUBLICATIONS

3GPP TS 23.501, V0.5.0,"3rd Generation Partnership Project;Technical Specification Group Services and System Aspects; System Architecture for t.he 5G System; St.age 2 ( Release 15)",Jun. 1, 2017 (Jun. 1, 2017), pp. 1-145, XP051298314.

3GPP TS 23.501 V1.0.0 (Jun. 2017);3rd Generation Partnership Project;Technical Specification Group Services and System Aspects-;System Architecture for the 5G System;Stage 2(Release 15);total 145 pages.

Huawei et al: "TS 23.501: Provision of UE policy from PCF to UE",3GPP Draft; S2-172255,Mar. 26, 2017 (Mar. 26, 2017), XP051247981,total 3 pages.

Samsung: "UE policy interface",3GPP Draft; S2-170334_Jan. 16, 2017 (Jan. 16, 2017), XP051216520,total 6 pages.

Chinese Office Action issued in corresponding Chinese Application No. 201710585547.6, dated Mar. 17, 2020, State Intellectual Property Office of the People's Republic of China, Beijing, China.

Extended European Search Report issued in corresponding European Application No. 18835267.8, dated May 27, 2020, European Patent Office, Munich, Germany.

International Search Report issued in corresponding International Application No. PCT/CN2018/091202, dated Aug. 20, 2018, State Intellectual Property Office of the People's Republic of China, Beijing, China.

\* cited by examiner de SESSION PROCESSING METHOD AND APPARATUS

CROSS-REFERENCE TO RELATED APPLICATIONS

This application is a continuation of International Application No. PCT/CN2018/091202, filed on Jun. 14, 2018, which claims priority to Chinese Patent Application No. 201710585547.6, filed on Jul. 18, 2017. The disclosures of the aforementioned applications are hereby incorporated by reference in their entireties.

TECHNICAL FIELD

This application relates to the field of communications technologies, and in particular, to a session processing method and apparatus.

BACKGROUND

Currently, in a terminal device (User Equipment, UE) (for example, a mobile phone, or a tablet computer), a plurality of applications may be installed. Network data usually needs to be used during running of applications.

After an application is started in a UE, and when the application needs to transmit data through a network, a session is usually established directly for the application, and data transmission is performed based on the established session. However, during actual application, after an application is started in the UE each time, a session corresponding to the application needs to be established. When a plurality of applications are simultaneously started in the UE, the UE needs to establish a plurality of sessions. Each time the UE establishes a session, the UE needs to perform signaling interaction with a network device, resulting in waste of signaling overhead.

SUMMARY

This application provides a session processing method and apparatus, to reduce signaling overhead.

According to a first aspect, this application provides a session processing method. An execution body of the method is terminal device UE. When the UE starts a first application and determines that the first application is not associated with a session parameter of a first session, the UE obtains indication information and, in response to the UE obtaining indication information, the UE transmits data of the first application through the first session, where the indication information indicates that the session parameter of the first session can satisfy a session requirement of the first application that is not associated with the session parameter.

In the foregoing process, the UE directly transmits the data of the first application through the first session established by the UE, and does not need to establish a new session for the first application, thereby saving signaling overhead.

Optionally, when session parameters with which the first application is not associated are different, manners in which the UE transmits the data of the first application through the first session are also different. At least the following three feasible implementations are included:

in a first feasible implementation, when the session parameter of the first session with which the first application is not associated is a network slice identifier of the first session, the UE transmits the data of the first application by using a network slice corresponding to the network slice identifier of the first session;

in a second feasible implementation, when the session parameter with which the first application is not associated is a data network identifier of the first session, the UE transmits the data of the first application by using a data network corresponding to the data network identifier of the first session; and in a third feasible implementation, when the session parameter with which the first application is not associated is a service and session continuity mode of the first session, the UE transmits the data of the first application based on the session continuity mode of the first session.

According to a second aspect, this application provides a session processing method. An execution body of the method is a control plane CP network element. After receiving a first message for requesting to establish a first session, the CP network element obtains a session parameter of the first session. When learning of that the session parameter of the first session can satisfy an application that is not associated with the session parameter of the first session, the CP network element sends indication information to a terminal device UE, where the indication information indicates that the session parameter of the first session can satisfy the application that is not associated with the session parameter of the first session.

In the process in which the CP network element establishes the first session for the UE, the CP network element determines, based on the session parameter of the first session, whether the session parameter of the first session can satisfy the application that is not associated with the session parameter of the first session. If the session parameter of the first session can satisfy the application that is not associated with the session parameter of the first session, the indication information of the session parameter of the first session is generated and the indication information of the session parameter of the first session is sent to the UE, so that the UE can store the indication information of the session parameter of the first session. In this way, when stating an application subsequently, the UE can determine, based on the indication information, whether the first session can be reused. When the UE determines, based on the indication information of the first session, that the first session can be reused, there is no need to establish a new session for the newly started application, thereby saving signaling overhead.

In a possible implementation, when the CP network element is an access and mobility management function AMF network element (AMF network element), the CP network element may learn of that the session parameter of the first session can satisfy the application that is not associated with the session parameter of the first session in at least the following three feasible implementations:

In a first feasible implementation, the AMF network element determines that the session parameter of the first session can satisfy the application that is not associated with the session parameter of the first session, where the session parameter of the first session includes at least one of a network slice identifier and a data network identifier.

In this feasible implementation, the AMF network element determines whether the session parameter of the first session can satisfy the application that is not associated with the session parameter of the first session, and the AMF network element does not need to request other network elements for determining, thereby saving signaling overhead between the AMF network element and other network elements.

In a second feasible implementation, the AMF network element sends a first request message to a policy control function PCF network element, and receives a first response message from the PCF network element, where the first response message includes indication information, and the session parameter of the first session includes at least one of a network slice identifier and a data network identifier.

In this feasible implementation, the AMF network element requests the PCF network element to determine whether the session parameter of the first session can satisfy the application that is not associated with the session parameter of the first session, and the PCF network element shares a part of working content of the AMF network element, to alleviate load of the AMF network element, thereby improving working efficiency of the AMF network element.

In a third feasible implementation, the AMF network element sends a second request message to a session management function SMF network element, and receives a second response message from the SMF network element, where the second response message includes indication information, and the session parameter of the first session includes at least one of an identifier of a network slice identifier of the first session, a data network identifier of the first session, and a service and session continuity SSC mode of the first session.

In this feasible implementation, the AMF network element requests the SMF network element to determine whether the session parameter of the first session can satisfy the application that is not associated with the session parameter of the first session, and the SMF network element shares a part of working content of the AMF network element, to alleviate load of the AMF network element, thereby improving working efficiency of the AMF network element.

In the first feasible implementation, optionally, the AMF network element may determine that the session parameter of the first session can satisfy the application that is not associated with the session parameter of the first session in at least the following three feasible implementations:

In a first feasible implementation, the AMF network element determines that the session parameter of the first session can satisfy the application that is not associated with the session parameter of the first session based on a service type of the first session.

In a second feasible implementation, the AMF network element determines that the session parameter of the first session can satisfy the application that is not associated with the session parameter of the first session based on an application identifier corresponding to the first session.

In a third feasible implementation, the AMF network element determines that the session parameter of the first session can satisfy the application that is not associated with the session parameter of the first session based on subscription data or a local policy.

Optionally, after learning of that the session parameter of the first session can satisfy the application that is not associated with the session parameter of the first session, the AMF network element can further send the indication information to the SMF network element.

In another possible implementation, when the CP network element is an SMF network element, the CP network element (SMF network element) may learn of that the session parameter of the first session can satisfy the application that is not associated with the session parameter of the first session in at least the following two feasible implementations:

In a first feasible implementation, the SMF network element determines that the session parameter of the first session can satisfy the application that is not associated with the session parameter of the first session, where the session parameter of the first session includes at least one of a network slice identifier, a data network identifier, and an SSC mode.

In this feasible implementation, the SMF network element determines whether the session parameter of the first session can satisfy the application that is not associated with the session parameter of the first session, and the SMF network element does not need to request other network elements for determining, thereby saving signaling overhead between the SMF network element and other network elements.

In a second feasible implementation, the SMF network element sends a third request message to a PCF network element, and receives a third response message from the PCF network element, where the third response message includes the indication information, and the session parameter of the first session includes at least one of a network slice identifier, a data network identifier, and an SSC mode.

In this feasible implementation, the SMF network element requests the PCF network element to determine whether the session parameter of the first session can satisfy the application that is not associated with the session parameter of the first session, and the PCF network element shares a part of working content of the SMF network element, to alleviate load of the SMF network element, thereby improving working efficiency of the SMF network element.

In the first feasible implementation, optionally, the SMF network element may determine that the session parameter of the first session can satisfy the application that is not associated with the session parameter of the first session in at least the following three feasible implementations:

In a first feasible implementation, the SMF network element determines that the session parameter of the first session can satisfy the application that is not associated with the session parameter of the first session based on a service type corresponding to the first session.

In a second feasible implementation, the SMF network element determines that the session parameter of the first session can satisfy the application that is not associated with the session parameter of the first session based on an application identifier corresponding to the first session.

In a third feasible implementation:

the SMF network element determines that the session parameter of the first session can satisfy the application that is not associated with the session parameter of the first session based on subscription data or a local policy.

According to a third aspect, this application provides a session processing method. An execution body of the method is a policy control function PCF network element. After the PCF network element receives a request message including a session parameter of a first session from a control plane CP network element, and when the PCF network element determines that the session parameter of the first session can satisfy an application that is not associated with the session parameter of the first session, the PCF network element sends a response message to the CP network element, where the response message indicates that the session parameter of the first session can satisfy the application that is not associated with the session parameter of the first session.

In the foregoing process, the PCF network element assists the CP network element in determining whether the session parameter of the first session can satisfy the application that is not associated with the session parameter of the first session, and the PCF network element shares a part of working content of the CP network element, to alleviate load of the CP network element, thereby improving working efficiency of the CP network element.

According to a fourth aspect, this application provides a session processing method. An execution body of the method is a session management function SMF network element. After receiving a first message for requesting to establish a session corresponding to a first application for UE from the terminal device UE, the SMF network element obtains a session parameter requirement corresponding to the first application. When learning that a session parameter of a first session established by the UE can satisfy the session parameter requirement corresponding to the first application, the SMF network element sends identification information of the first session to the UE. The identification information of the first session is used for data transmission of the first application.

In the foregoing process, after starting the first application, the UE directly requests a network side device to establish a session for the first application. In a process in which the network device establishes the session for the first application, it is determined whether the session parameter of the established session in the UE can satisfy the session parameter requirement corresponding to the first application. If the session parameter of the established session in the UE can satisfy the session parameter requirement corresponding to the first application, the network side device refuses to establish a new session for the first application, and instead, sends an identifier of the established session to the UE, so that the UE transmits data of the first application based on the established session. In this way, there is no need to establish a new session for the first application, thereby saving signaling overhead and reducing a quantity of sessions on the terminal.

Optionally, before the SMF network element sends the identification information of the first session to the UE, the SMF may obtain the session parameter of the first session in at least the following two feasible implementations:

In a first feasible implementation,
the SMF network element requests the UE for the session parameter of the first session.

In a second feasible implementation,
the SMF network element obtains the session parameter of the first session from a database.

Optionally, that the SMF network element learns of that the session parameter of the first session established by the UE satisfies the session parameter requirement corresponding to the first application includes:

learning of, by the SMF network element, that the session parameter of the first session is correspondingly the same as the session parameter requirement corresponding to the first application, where the session parameter includes at least one of a network slice identifier, a data network identifier, and a service and session continuity SSC mode.

According to a fifth aspect, this application provides a session processing apparatus, including a determining module and a transmission module, where the determining module is configured to determine that a first application is not associated with the session parameter of the first session when terminal device UE starts the first application; and the transmission module is configured to transmit data of the first application through a first session in response to the UE obtaining indication information, where the indication information indicates that a session parameter of the first session can satisfy an application that is not associated with the session parameter of the first session.

In a possible implementation, when the session parameter of the first session with which the first application is not associated is a network slice identifier, the transmission module is configured to transmit the data of the first application by using a network slice corresponding to a network slice identifier of the first session;

when the session parameter of the first session with which the first application is not associated is a data network identifier, the transmission module is configured to transmit the data of the first application by using a data network corresponding to a data network identifier of the first session; and when the session parameter of the first session with which the first application is not associated is a service and session continuity SSC mode, the transmission module is configured to transmit the data of the first application based on an SSC mode of the first session.

According to a sixth aspect, this application provides a session processing apparatus, applied to a control plane CP network element, where the apparatus includes a receiving module, an obtaining module, a learning module and a sending module, where the receiving module is configured to receive a first message, where the first message is used to request to establish a first session;

the obtaining module is configured to obtain a session parameter of the first session;

the learning module is configured to learn of that the session parameter of the first session can satisfy an application that is not associated with the session parameter of the first session; and the sending module is configured to send indication information to terminal device UE, where the indication information indicates that the session parameter of the first session can satisfy the application that is not associated with the session parameter of the first session.

In a possible implementation, the CP network element is an access and mobility management function AMF network element; and the learning module is configured to:

determine that the session parameter of the first session can satisfy the application that is not associated with the session parameter of the first session, where the session parameter of the first session includes at least one of a network slice identifier and a data network identifier;

or, send a first request message to a policy control function PCF network element, and receive a first response message from the PCF network element, where the first response message includes the indication information, and the session parameter of the first session includes at least one of a network slice identifier and a data network identifier;

or, send a second request message to a session management function SMF network element, and receive a second response message from the SMF network element, where the second response message includes the indication information, and the session parameter of the first session includes at least one of a network slice identifier, a data network identifier, and a service and session continuity SSC mode.

In another possible implementation, the sending module is further configured to send the indication information to the SMF network element after the learning module learns of that the session parameter of the first session can satisfy the application that is not associated with the session parameter of the first session.

In another possible implementation, the CP network element is an SMF network element; and the learning module is configured to:

determine that the session parameter of the first session can satisfy the application that is not associated with the session parameter of the first session, where the session parameter of the first session includes at least one of an identifier of a network slice identifier, a data network identifier, and an SSC mode;

or, send a third request message to a PCF network element, and receive a third response message from the PCF network element, where the third response message includes the indication information, and the session parameter of the first session includes at least one of a network slice identifier, a data network identifier, and an SSC mode.

In another possible implementation, the learning module is configured to:

determine that the session parameter of the first session can satisfy the application that is not associated with the session parameter of the first session based on a service type corresponding to the first session;

or, determine that the session parameter of the first session can satisfy the application that is not associated with the session parameter of the first session based on an application identifier corresponding to the first session;

or, determine that the session parameter of the first session can satisfy the application that is not associated with the session parameter of the first session based on subscription data or a local policy.

According to a seventh aspect, this application provides a session processing apparatus, including a receiving module, a determining module and a sending module, where the receiving module is configured to receive a request message from a control plane CP network element, where the request message includes a session parameter of a first session;

the determining module is configured to determine that the session parameter of the first session can satisfy an application that is not associated with the session parameter of the first session; and the sending module is configured to send a response message to the CP network element, where the response message indicates that the session parameter of the first session can satisfy the application that is not associated with the session parameter of the first session.

According to an eighth aspect, this application provides a session processing apparatus, including a receiving module, a first obtaining module, a learning module and a sending module, where the receiving module is configured to receive a first message from terminal device UE, where the first message is used to request to establish a session corresponding to a first application for the UE;

the first obtaining module is configured to obtain a session parameter requirement corresponding to the first application;

the learning module is configured to learn of that a session parameter of a first session established by the UE satisfies the session parameter requirement corresponding to the first application; and the sending module is configured to send identification information of the first session to the UE, where the identification information of the first session is used for data transmission of the first application.

In a possible implementation, the apparatus further includes a second obtaining module, where the second obtaining module is configured to: request the UE for the session parameter of the first session before the sending module sends the identification information of the first session to the UE; or obtain the session parameter of the first session from a database.

In another possible implementation, the learning module is configured to:

learn of that the session parameter of the first session is correspondingly the same as the session parameter requirement corresponding to the first application, where the session parameter includes at least one of a network slice identifier, a data network identifier, and a service and session continuity SSC mode.

According to a ninth aspect, this application provides a terminal device, including a processor, a memory, and a communications bus, where the communications bus is configured to implement a connection between components, the memory is configured to store a program instruction, and the processor is configured to: read the program instruction in the memory, and perform the method of any implementation of the first aspect according to the program instruction in the memory.

According to a tenth aspect, this application provides a control plane network element, including a processor, a memory, and a communications bus, where the communications bus is configured to implement a connection between components, the memory is configured to store a program instruction, and the processor is configured to: read the program instruction in the memory, and perform the method of any of the second aspect according to the program instruction in the memory.

According to an eleventh aspect, this application provides a policy control function network element, including a processor, a memory, and a communications bus, where the communications bus is configured to implement a connection between components, the memory is configured to store a program instruction, and the processor is configured to: read the program instruction in the memory, and perform the method of any of the third aspect according to the program instruction in the memory.

According to a twelfth aspect, this application provides a session management function network element, including a processor, a memory, and a communications bus, where the communications bus is configured to implement a connection between components, the memory is configured to store a program instruction, and the processor is configured to: read the program instruction in the memory, and perform the method of any of the fourth aspect according to the program instruction in the memory.

According to a thirteenth aspect, this application provides a computer readable storage medium. The computer readable storage medium stores a computer executable instruction, and when at least one processor of a storage device executes the computer executable instruction, the storage device performs the data reading method provided in the foregoing possible designs.

According to a fourteenth aspect, this application provides a computer program product. The computer program product includes a computer executable instruction, and the computer executable instruction is stored in a computer readable storage medium. At least one processor of a storage device can read the computer executable instruction from the computer readable storage medium. The at least one processor executes the computer executable instruction, so that the storage device performs the data reading method provided in the foregoing possible designs in the foregoing method embodiments.

According to a fifteenth aspect, this application provides a chip system. The chip system includes a processor, configured to support a session management device in implementing functions in the foregoing aspects, for example, generating or processing information in the foregoing methods. In a possible design, the chip system further includes a memory. The memory is configured to store a program instruction and data necessary to a data sending device. The chip system may include a chip, or may include a chip and another discrete device.

According to the session processing method and apparatus provided in this application, in the process in which the CP network element establishes the first session for the UE, the CP network element determines, based on the session parameter of the first session, whether the session parameter of the first session can satisfy the application that is not associated with the session parameter of the first session. If the session parameter of the first session can satisfy the application that is not associated with the session parameter of the first session, the indication information of the session parameter of the first session is generated and the indication information of the session parameter of the first session is sent to the UE, so that the UE can store the indication information of the session parameter of the first session. Correspondingly, when the UE starts the first application, or when the UE needs to transmit the data of the first application and a session corresponding to the first application does not exist in the UE, and when the UE determines that the first application is not associated with the session parameter of the first session, and the session parameter of the first session can satisfy the application that is not associated with the session parameter of the first session, the UE may transmit the data of the first application through the first session. In this way, there is no need to establish a new session for the first application, thereby saving signaling overhead.

DESCRIPTION OF EMBODIMENTS

Figure 1:
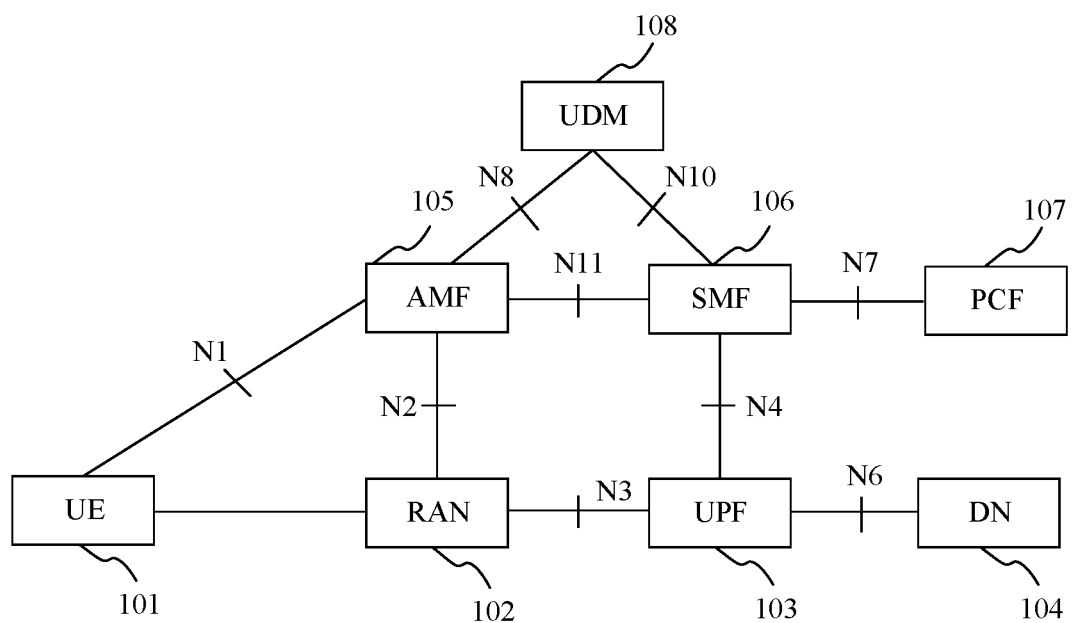
FIG. 1 is an architectural diagram of a system according to this application.

FIG. 1 is an architectural diagram of a system according to this application. Referring to FIG. 1, a communications system may include UE 101, a radio access network (RAN) network element 102, a user plane function (UPF) network element 103, a data network (DN) 104, an access and mobility management function (AMF) network element 105, a session management function (SMF) network element 106, a policy control function (PCF) network element 107, and a unified data management (UDM) network element 108.

The UE 101 in this application may be a mobile phone (or referred to as a "cellular" phone), or a computer having a mobile terminal, for example, a portable, pocket-sized, handheld, computer built-in or in-vehicle mobile apparatus. The UE 101 may also be referred to as a terminal device, a mobile station (MS), or a terminal, or may include a subscriber unit, a cellular phone, a smartphone, a wireless data card, a personal digital assistant (PDA) computer, a tablet computer, a wireless modem, a handheld, a laptop computer, a cordless phone or a wireless local loop (WLL) station, a machine type communication (MTC) terminal, or the like.

The RAN network element 102 may provide a wireless access device for the UE. The RAN network element 102 may include base stations of various forms, for example, a macro base station, a micro base station (also referred to as a small cell), a relay station, and an access point. In systems using different radio access technologies, a device having a function of the base station may be named differently. For example, the device is referred to as an evolved NodeB (eNB or eNodeB) in an LTE system, and referred to as a NodeB in a 3rd generation (3G) system. In a new generation system, the base station is referred to as a gNB (gNodeB).

The UPF network element 103 is responsible for processing user packets, such as forwarding and collecting statistics on the packets. The UPF network element 103 may further complete executing session-related policies based on an instruction of the SMF. Through the UPF network element 103, the UE can be connected to the DN 104.

The AMF network element 105 may be configured to forward messages exchanged between the SMF and the UE, and may further be configured to be responsible for mobility management, such as user location update, registration of a user with a network, and user switching, in a mobile network.

The SMF network element 106 is responsible for session management, such as session establishment and session modification and session release, in a mobile network.

The PCF network element 107 is configured to formulate UE policies, such as a quality of service (QoS) policy and a slice selection policy.

The UDM network element 108 is configured to store subscription information of the UE, for example, subscription data related to mobility management and subscription data related to session management.

An unstructured data storage function (UDSF) may be disposed in some network side devices (for example, the AMF network element 105, the SMF network element 106, the PCF network element 107 and the UDM network element 108). The UDSF is configured to store unstructured data. For example, the unstructured data may be context information of the UE, and the context information of the UE may include at least one of an identifier, a session identifier or a session parameter of the UE. It should be noted that the UDSF may also be separately deployed, and this application does not specifically limit the deployment manner of the UDSF.

In this application, in the process in which the network side device (for example, an AMF device or an SMF device) establishes a session for the UE, the network side device determines, based on a session parameter of the established session, whether the session parameter of the established session can satisfy an application that is not associated with the session parameter of the established session. If the session parameter of the established session can satisfy the application that is not associated with the session parameter of the established session, indication information of the session parameter of the established session is generated and the indication information of the session parameter of the established session is sent to the UE, so that the UE can store the indication information of the session parameter of the established session. Correspondingly, when the UE starts a first application, and when the UE determines that the first application is not associated with a session parameter of the first session, and the session parameter of the first session can satisfy the application that is not associated with the session parameter of the first session, the UE can transmit data of the first application through the first session. In this way, there is no need to establish a new session for the first application, thereby saving signaling overhead. Alternatively, after starting the first application, the UE directly requests the network side device to establish a session for the first application. In the process in which the network device establishes the session for the first application, it is determined whether the session parameter of the established session in the UE can satisfy a session parameter requirement corresponding to the first application. If the session parameter of the established session in the UE can satisfy the session parameter requirement corresponding to the first application, the network side device refuses to establish a new session for the first application, and instead, sends an identifier of the established session to the UE, so that the UE transmits the data of the first application based on the established session. In this way, there is no need to establish a new session for the first application, thereby saving signaling overhead.

Example embodiments are used below to describe in detail the technical solutions of this application. It should be noted that the following embodiments may be combined with each other, and same or similar content is not described repeatedly in different embodiments.

It should be noted that a session processing method is described in the embodiments of FIG. 2 to FIG. 5A and FIG. 5B. Another session processing method is described in the embodiments shown in FIG. 6A, FIG. 6B and FIG. 7.

Figure 2:
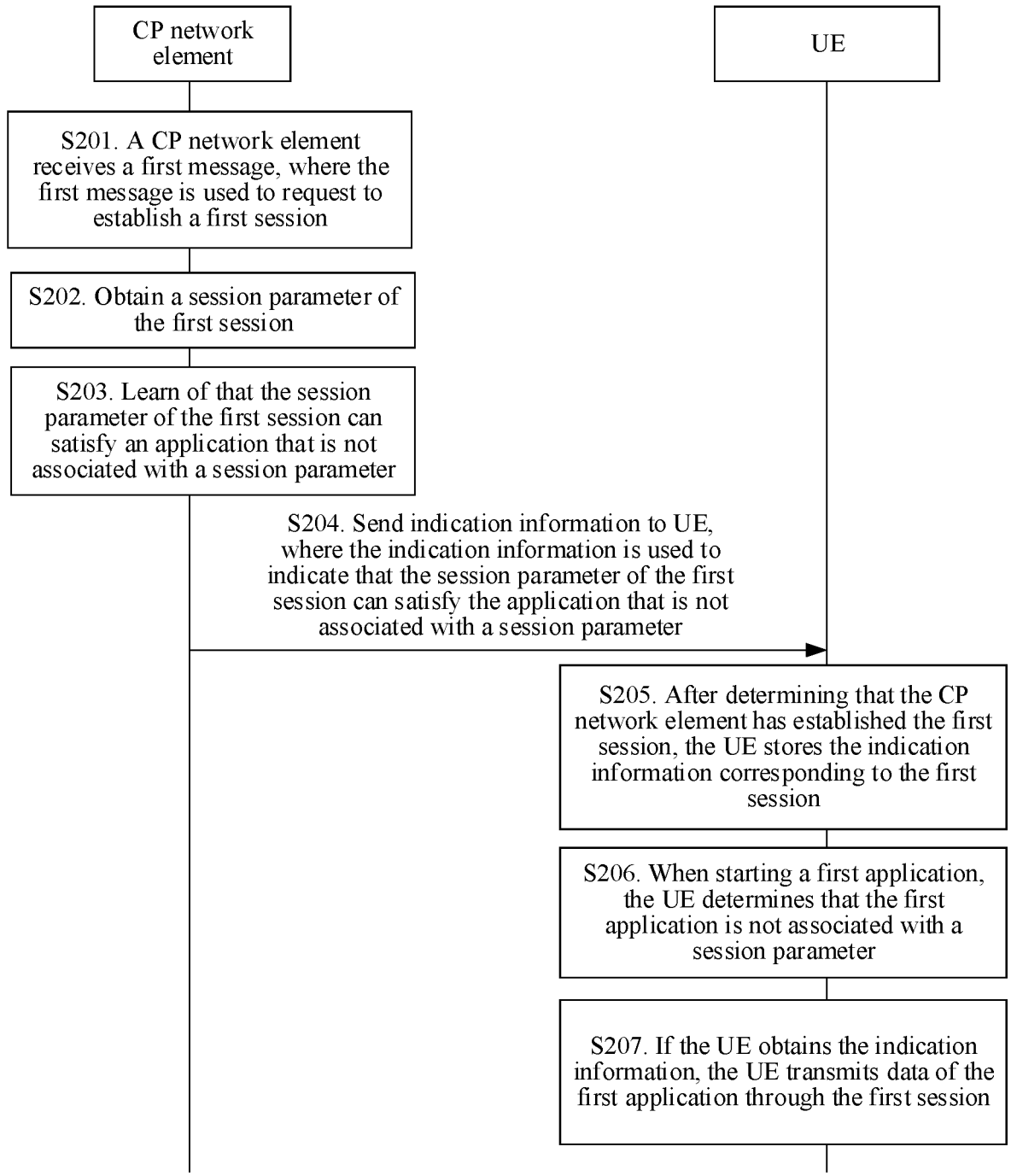
FIG. 2 is a first schematic diagram of a session processing method according to this application.

FIG. 2 is a first schematic diagram of a session processing method according to this application. Referring to FIG. 2, the method may include the following steps.

S201. A control plane (CP) network element receives a first message, where the first message is used to request to establish a first session.

For example, when UE (for example, the UE 101 in FIG. 1) needs to transmit data, and no usable session exists in the UE currently, the UE sends the first message to the CP network element to request to establish the first session.

Optionally, the CP network element may be an AMF network element (for example, the AMF network element 105 in FIG. 1), or the CP network element may also be an SMF network element (for example, the SMF network element 106 in FIG. 1).

Optionally, when the CP network element is the AMF network element, the AMF network element can receive the first message from the UE. The first message may be a non-access stratum (NAS) message sent by the UE through a RAN network element (for example, the RAN network element 102 in FIG. 1). The NAS message may include an identifier of the first session and session management (SM) information. Optionally, the NAS message may further include a session parameter of the first session. For example, a single network slice selection assistance information (S-NSSAI) parameter and/or a data network name (DNN) parameter may be included outside the SM information of the NAS message. In addition, a service and session continuity (SSC) mode may be included inside the SM information.

Optionally, the S-NSSAI parameter is used to identify a network slice. In other words, an identifier of the network slice may be obtained through determining based on the S-NSSAI parameter. The DNN parameter is used to identify a data network. In other words, an identifier of the data network may be obtained through determining based on the DNN parameter. The SSC mode indicates a requirement on service and session continuity.

Optionally, when the CP network element is the SMF network element, the SMF network element may receive the first message from the AMF network element. The first message may be an SM request message. The SSC mode of the first session may be included in the SM request message. The first message may further include the S-NSSAI parameter and/or the DNN parameter of the first session.

It should be noted that the session parameter of the first session is described above merely in a form of examples, and the session parameter of the first session is not limited. In an actual application process, the session parameter of the first session may be set based on actual requirements and is not specifically limited in this application.

S202. The CP network element obtains the session parameter of the first session.

The manners of obtaining the session parameter of the first session by the CP network element are different when the CP network element is the AMF network element or the SMF network element. Examples are listed below.

When the CP network element is the AMF network element, the session parameter of the first session obtained by the AMF network element includes the S-NSSAI parameter and the DNN parameter. After receiving the first message (that is, the NAS message), if the first message includes the S-NSSAI parameter and the DNN parameter, the AMF network element directly obtains the S-NSSAI parameter and the DNN parameter of the first session in the first message; if the first message does not include the S-NSSAI parameter and the DNN parameter, the AMF network element obtains the S-NSSAI parameter and the DNN parameter of the first session based on subscription data. For example, the AMF network element can obtain subscription data of the UE from the UDM network element (for example, the UDM network element 108 in FIG. 1). The subscription data includes the S-NSSAI parameter and the DNN parameter that can be used by the UE. The AMF network element selects the S-NSSAI parameter and/or the DNN parameter of the first session from parameters that can be used by the UE.

When the CP network element is the SMF network element, the session parameter of the first session obtained by the SMF network element includes the S-NSSAI parameter, the DNN parameter, and an optional SSC mode. The first message received by the SMF network element is sent by the AMF network element. The first message may be an SM request message sent by the AMF network element to the SMF network element. The first message includes the S-NSSAI parameter and/or the DNN parameter. If the SM information in the first message includes the SSC mode, the SMF network element obtains the SSC mode of the first session in the SM information. If the SM information in the first message does not include the SSC mode, the SMF network element can obtain the SSC mode of the first session based on subscription data. For example, the SMF network element can obtain subscription data of the UE from the UDM network element, and the subscription data includes the SSC mode that can be used by the UE. The SMF network element selects the SSC mode of the first session from SSC modes that can be used by the UE.

S203. The CP network element learns of that the session parameter of the first session can satisfy an application that is not associated with the session parameter of the first session.

"An application that is not associated with the session parameter of the first session" indicates that the UE cannot obtain at least one session parameter of the application associated with the first session for some reason. In addition, "an application that is not associated with the session parameter" may have other expressions, for example, "there is no requirement for at least one session parameter of the application", and "at least one session parameter of the application has an invalid value (for example, a null value)".

When the CP network element is the AMF network element, the AMF network element can determine whether the S-NSSAI parameter and/or the DNN parameter of the first session can satisfy the application that is not associated with the session parameter of the first session. The AMF network element may also request the PCF network element (for example, the PCF network element 107 in FIG. 1) to determine whether the S-NSSAI parameter and/or the DNN parameter of the first session can satisfy the application that is not associated with the session parameter of the first session. The AMF network element may also request the SMF network element to determine whether any one of the S-NSSAI parameter, the DNN parameter and the SSC mode of the first session can satisfy the application that is not associated with the session parameter of the first session.

When the CP network element is the SMF network element, the SMF network element can determine whether any one of the S-NSSAI parameter, the DNN parameter and the SSC mode of the first session can satisfy the application that is not associated with the session parameter of the first session. The SMF may also request the PCF to determine whether any one of the S-NSSAI parameter, the DNN parameter and the SSC mode of the first session can satisfy the application that is not associated with the session parameter of the first session.

It should be noted that step S203 may include: determining, by the AMF network element or the PCF network element, whether the S-NSSAI parameter and/or the DNN parameter can satisfy the application that is not associated with the session parameter of the first session, and determining, by the SMF network element, whether the SSC mode can satisfy the application that is not associated with the session parameter of the first session.

It should be noted that, when the AMF network element, or the PCF network element or the SMF network element determines whether the session parameter of the first session can satisfy the application that is not associated with the session parameter of the first session, the determining may be performed in at least the following three feasible implementations.

In a first feasible implementation, it is determined, based on a service type corresponding to the first session, whether the session parameter of the first session can satisfy the application that is not associated with the session parameter of the first session.

For example, the service type may include: a voice service type, a video service type, an unmanned service type, an Internet of Things service type, or the like. A preset correspondence between the service type and whether the session parameter of the first session can satisfy the application that is not associated with the session parameter of the first session is stored in the network element (for example, the AMF network element, or the PCF network element or the SMF network element) that can make a judgment. For example, the preset correspondence may be shown in Table 1:

TABLE 1

| Service type | S-NSSAI parameter | DNN parameter | SSC mode |
|---|---|---|---|
| Voice service | Yes | Yes | Yes |
| Video service | No | No | No |
| Unmanned service | No | No | No |
| Internet of Things service | Yes | Yes | No |
| ... | ... | ... | ... |

For example, based on Table 1, the S-NSSAI parameter, the DNN parameter and the SSC mode of the voice service can all satisfy the application that is not associated with the session parameter of the first session; the S-NSSAI parameter, the DNN parameter and the SSC mode of the video service cannot satisfy the application that is not associated with the session parameter of the first session; the S-NSSAI parameter, the DNN parameter and the SSC mode of the unmanned service cannot satisfy the application that is not associated with the session parameter of the first session; the S-NSSAI parameter and the DNN parameter of the Internet of Things service can satisfy the application that is not associated with the session parameter of the first session and the SSC mode of the Internet of Things service cannot satisfy the application that is not associated with the session parameter of the first session.

Optionally, the first message received by the AMF network element or the SMF network element includes the service type corresponding to the first session. The AMF network element or the SMF network element can determine, based on a service type included in the first message and the correspondence shown in Table 1, whether the session parameter of the first session can satisfy the application that is not associated with the session parameter of the first session.

When the AMF network element or the SMF network element requests the PCF network element to determine whether the session parameter of the first session can satisfy the application that is not associated with the session parameter of the first session, the AMF network element or the SMF network element can send the service type to the PCF network element, so that the PCF network element determines, based on the service type and the correspondence shown in Table 1, whether the session parameter of the first session can satisfy the application that is not associated with the session parameter of the first session.

In a second feasible implementation, it is determined, based on an application identifier corresponding to the first session, whether the session parameter of the first session can satisfy the application that is not associated with the session parameter of the first session.

For example, the application identifier is used to identify the application, and may be an application name. A preset correspondence between the application identifier and whether the session parameter of the first session can satisfy the application that is not associated with the session parameter of the first session is stored in the network element (for example, the AMF network element, or the PCF network element or the SMF network element) that can make a judgment. For example, the preset correspondence may be shown in Table 2:

TABLE 2

| Application identifier | S-NSSAI parameter | DNN parameter | SSC mode |
|---|---|---|---|
| Application 1 | No | Yes | Yes |
| Application 2 | Yes | Yes | Yes |
| Application 3 | No | No | No |
| Application 4 | Yes | Yes | No |
| ... | ... | ... | ... |

For example, based on Table 1, the S-NSSAI parameter of the application 1 cannot satisfy the application that is not associated with the session parameter of the first session; the DNN parameter and the SSC mode of the application 1 can satisfy the application that is not associated with the session parameter of the first session; the S-NSSAI parameter, the DNN parameter and the SSC mode of the application 2 can all satisfy the application that is not associated with the session parameter of the first session; the S-NSSAI parameter, the DNN parameter and SSC mode of the application 3 cannot satisfy the application that is not associated with the session parameter of the first session; and the S-NSSAI parameter and the DNN parameter of application 4 can satisfy the application that is not associated with the session parameter of the first session and the SSC mode of application 4 cannot satisfy the application that is not associated with the session parameter of the first session.

Optionally, the first message received by the AMF network element or the SMF network element includes an application identifier. The AMF network element or the SMF network element can determine, based on the application identifier included in the first message and the correspondence shown in Table 2, whether the session parameter of the first session can satisfy the application that is not associated with the session parameter of the first session.

When the AMF network element or the SMF network element requests the PCF network element to determine whether the session parameter of the first session can satisfy the application that is not associated with the session parameter of the first session, the AMF network element or the SMF network element can send the application identifier to the PCF network element, so that the PCF network element determines, based on the application identifier and the correspondence shown in Table 2, whether the session parameter of the first session can satisfy the application that is not associated with the session parameter of the first session.

In a third feasible implementation, it is determined, based on subscription data or a local policy, that the session parameter of the first session can satisfy the application that is not associated with the session parameter of the first session. For example, the subscription data or a local policy includes a correspondence between the session parameter of the first session and whether the session parameter of the first session can satisfy the application that is not associated with the session parameter of the first session.

For example, the correspondence may be shown in Table 3:

TABLE 3

| S-NSSAI-1 | No |
| ... | ... |
| S-NSSAI-N | Yes |
| DNN-1 | Yes |
| ... | ... |
| DNN-M | Yes |
| SSC1 | Yes |
| SSC2 | Yes |
| SSC3 | No |

For example, based on Table 3, the S-NSSAI parameter 1 cannot satisfy the application that is not associated with the session parameter of the first session; the S-NSSAI parameter N can satisfy the application that is not associated with the session parameter of the first session; the DNN parameter 1 can satisfy the application that is not associated with the session parameter of the first session, the DNN parameter M can satisfy the application that is not associated with the session parameter of the first session; and the SSC mode 1 and SSC mode 2 can satisfy the application that is not associated with the session parameter of the first session, and the SSC mode 3 cannot satisfy the application that is not associated with the session parameter of the first session.

It should be noted that a UDSF or the local policy stores a correspondence between the service type or the application identifier and whether the session parameter of the first session can satisfy the application that is not associated with the session parameter of the first session. For the correspondence, refer to the first or the second feasible implementation. Details are not described herein again.

Correspondingly, the AMF network element or the PCF network element or the SMF network element can determine, based on the session parameter of the first session and the correspondence shown in Table 3, whether the session parameter of the first session can satisfy the application that is not associated with the session parameter of the first session.

S204. The CP network element sends indication information to the UE, where the indication information indicates that the session parameter of the first session can satisfy the application that is not associated with the session parameter of the first session.

Optionally, the indication information may be sent to the UE after the CP network element establishes the first session for the UE. In this case, the indication information may be carried in a session establishment complete message sent by the CP network element to the UE. Certainly, the indication information may be sent to the UE immediately after the CP network element generates the indication information.

Optionally, when determining that a first session parameter can satisfy the application that is not associated with the session parameter of the first session, the CP network element generates the indication information corresponding to the first session parameter.

For example, assuming that session parameters of the first session include the S-NSSAI parameter, the DNN parameter and the SSC mode, if the CP network element determines that the DNN parameter and the SSC mode can satisfy the application that is not associated with the session parameter of the first session, the CP network element generates the indication information corresponding to the DNN parameter and the indication information corresponding to the SSC mode.

It should be noted that, when all session parameters of the first session can satisfy the application that is not associated with the session parameter of the first session, the CP network element can generate wildcard indication information, where the wildcard indication information indicates that all session parameters of the first session can satisfy the application that is not associated with the session parameter of the first session.

S205. After determining that the CP network element has established the first session, the UE stores the indication information corresponding to the first session.

Optionally, after a lifecycle of the first session ends, the UE can delete the indication information corresponding to the first session.

It should be noted that, through S201 to S205, the first session is established for the UE, and the UE stores the indication information corresponding to the first session.

S206. When starting the first application, the UE determines that the first application is not associated with the session parameter of the first session.

For example, when starting the first application, the UE requests to obtain the session parameter associated with the first application. When the UE cannot obtain the session parameter of the first application, the UE can determine that the first application is not associated with the session parameter of the first session.

Optionally, the reason why the UE cannot obtain the session parameter of the first application may include: a UE policy in the UE is not timely updated, and consequently, the UE cannot obtain the session parameter of the first application; or the first application has no requirement for some session parameters, and consequently, the session parameters of the first application cannot be obtained by the UE.

In addition, when the UE needs to transmit data of the first application, and no session corresponding to the first application exists in the UE, or when the first application binds the established session of the UE, the UE can determine, by using the same method, that the first application is not associated with the session parameter of the first session.

For example, session parameter types corresponding to the first application include: the S-NSSAI parameter, the DNN parameter and the SSC mode. If the UE cannot obtain any one or more of the foregoing three types of session parameters corresponding to the first application, the UE can determine that the first application is not associated with the session parameter of the first session.

S207. In response to the UE obtaining the indication information, the UE transmits the data of the first application through the first session, where the indication information indicates that the session parameter of the first session can satisfy the application that is not associated with the session parameter of the first session.

The UE determines, based on the indication information corresponding to the first session, that the session parameter of the first session can satisfy the application that is not associated with the session parameter of the first session. Therefore, the session parameter of the first session can satisfy a session parameter requirement of the first application. The UE can transmit the data of the first application through the first session.

Optionally, when the first application is not associated with any of the three types of session parameters, it needs to be ensured that each session parameter of the first session can satisfy the application that is not associated with the session parameter of the first session. The indication information corresponding to each session parameter of the first session exists in the UE or the wildcard indication information corresponding to the first session exists in the UE.

For example, assuming that the session parameters of the first session and the indication information corresponding to the first session are shown in Table 4,

TABLE 4

| S-NSSAI-1 | Slice indication information | DNN-1 | DNN indication information | SSC mode 1 | SSC indication information |
|---|---|---|---|---|---| when the UE starts the first application, session parameters of the first application obtained by the UE are shown in Table 5:

TABLE 5

| S-NSSAI parameter | DNN parameter | SSC mode |
|---|---|---|
| / | / | / |

As shown in Table 5, the UE cannot obtain the S-NSSAI parameter, the DNN parameter and the SSC mode of the first application, and it may be determined that the session parameters of the first session with which the first application is not associated are the S-NSSAI parameter, the DNN parameter and the SSC mode. Based on Table 4, the UE can determine that the S-NSSAI parameter (S-NSSAI-1), the DNN parameter (DNN-1) and the SSC mode (SSC mode 1) of the first session can satisfy the application that is not associated with the session parameter of the first session. Therefore, the UE can determine that the session parameter of the first session can satisfy the session parameter requirement of the first application, and the UE can transmit the data of the first application through the first session.

Optionally, when the first application is not associated with some of the three types of session parameters, it needs to be ensured that the first session parameter of the first session can satisfy application of session parameters with which the first application is not associated, and a second session parameter of the first session is correspondingly the same as the session parameter of the first session with which the first application is associated.

For example, assuming that the session parameters of the first session and the indication information corresponding to the first session are shown in Table 6,

TABLE 6

| S-NSSAI-1 | Slicing indication information | DNN-1 | SSC mode 1 | SSC indication information |
|---|---|---|---|---| when the UE starts the first application, session parameters of the first application obtained by the UE are shown in Table 7:

TABLE 7

| S-NSSAI parameter | DNN parameter | SSC mode |
|---|---|---|
| / | DNN-1 | / |

As shown in Table 7, the UE cannot obtain the S-NSSAI parameter and the SSC mode of the first application, and it may be determined that the session parameters with which the first application is not associated are the S-NSSAI parameter and the SSC mode. Based on Table 6, the UE can determine that the S-NSSAI parameter (S-NSSAI-1) and the SSC mode (SSC mode 1) of the first session can satisfy the application that is not associated with the session parameter of the first session, and the DNN parameter (DNN-1) of the first session is the same as the DNN parameter (DNN-1) of the first application. Therefore, the UE can determine that the session parameter of the first session can satisfy the session parameter requirement of the first application, and the UE can transmit the data of the first application through the first session.

According to the session processing method provided in this application, in the process in which the CP network element establishes the first session for the UE, the CP network element determines, based on the session parameter of the first session, whether the session parameter of the first session can satisfy the application that is not associated with the session parameter of the first session. If the session parameter of the first session can satisfy the application that is not associated with the session parameter of the first session, the indication information of the session parameter of the first session is generated and the indication information of the session parameter of the first session is sent to the UE, so that the UE can store the indication information of the session parameter of the first session. Correspondingly, when the UE starts the first application, or when the UE needs to transmit the data of the first application and a session corresponding to the first application does not exist in the UE, and when the UE determines that the first application is not associated with the session parameter of the first session, and the session parameter of the first session can satisfy the application that is not associated with the session parameter of the first session, the UE may transmit the data of the first application through the first session. In this way, there is no need to establish a new session for the first application, thereby saving signaling overhead.

Based on the foregoing embodiment, optionally, when the CP network element needs to learn of whether the session parameter of the first session can satisfy the application that is not associated with the session parameter of the first session, the CP network element may request the PCF network element to determine whether the session parameter of the first session can satisfy the application that is not associated with the session parameter of the first session. This feasible implementation is described in detail below through the embodiment shown in FIG. 3.

Figure 3:
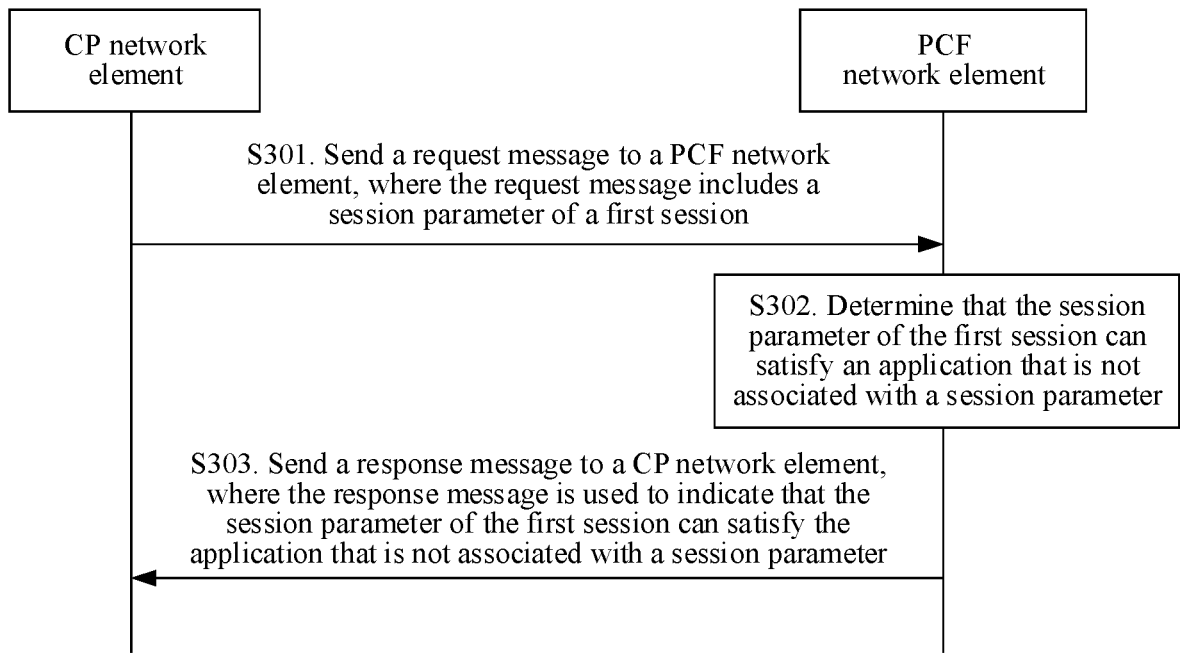
FIG. 3 is a second schematic diagram of a session processing method according to this application.

FIG. 3 is a second schematic diagram of a session processing method according to this application. Referring to FIG. 3, the method may include the following steps.

S301. A CP network element sends a request message to a PCF network element, where the request message includes a session parameter of a first session.

Optionally, the CP network element may be an AMF network element or the CP network element may alternatively be an SMF network element.

When the CP network element needs to learn of whether the session parameter of the first session can satisfy an application that is not associated with the session parameter of the first session, the CP network element may send a request message to the PCF network element, and add the session parameter of the first session to the request message.

Optionally, when the CP network element is the AMF network element, the session parameter of the first session that can be carried in the request message may include at least one of an S-NSSAI parameter and a DNN parameter. When the CP network element is the SMF network element, the session parameter of the first session that can be carried in the request message may include at least one of the S-NSSAI parameter, the DNN parameter and an SCC mode.

S302. The PCF network element determines that the session parameter of the first session can satisfy the application that is not associated with the session parameter of the first session It should be noted that, for the process of performing S302, refer to the descriptions in S203, and details are not described herein again.

S303. The PCF network element sends a response message to the CP network element, where the response message indicates that the session parameter of the first session can satisfy the application that is not associated with the session parameter of the first session.

Optionally, when determining that the session parameter of the first session can satisfy the application that is not associated with the session parameter of the first session, the PCF network element may generate indication information corresponding to the session parameter of the first session, and add the indication information to the response message. The indication information indicates that the session parameter of the first session can satisfy the application that is not associated with the session parameter of the first session.

For example, when the PCF network element determines that the S-NSSAI parameter of the first session can satisfy the application that is not associated with the session parameter of the first session, the indication information corresponding to the S-NSSAI parameter is generated and the indication information corresponding to the S-NSSAI parameter is carried in the response message; when the PCF network element determines that the DNN parameter of the first session can satisfy the application that is not associated with the session parameter of the first session, the indication information corresponding to the DNN parameter is generated, and the indication information corresponding to the DNN parameter is carried in the response message; and when the PCF network element determines that the SSC mode of the first session can satisfy the application that is not associated with, the indication information corresponding to the SSC mode is generated, and the indication information corresponding to the SSC mode is carried in the response message.

Based on any embodiment described above, in the process of establishing the first session by the CP network element, assuming that session parameters of the first session include the S-NSSAI parameter, the DNN parameter and the SSC mode, whether the three types of parameters of the first session can satisfy the application that is not associated with the session parameter of the first session can be determined in at least the following five feasible implementations.

In a first feasible implementation,
the SMF network element determines whether the S-NSSAI parameter, the DNN parameter and the SSC mode can satisfy the application that is not associated with the session parameter of the first session.

In a second feasible implementation,
the SMF network element determines whether the S-NSSAI parameter, and the SSC mode can satisfy the application that is not associated with the session parameter of the first session, and the AMF network element or the PCF network element determines whether the DNN parameter can satisfy the application that is not associated with the session parameter of the first session.

In a third feasible implementation,
the SMF network element determines whether the DNN parameter and the SSC mode can satisfy the application that is not associated with the session parameter of the first session, and the AMF network element or the PCF network element determines whether the S-NSSAI parameter can satisfy the application that is not associated with the session parameter of the first session.

In a fourth feasible implementation,
the SMF network element determines whether the SSC mode can satisfy the application that is not associated with the session parameter of the first session, and the AMF network element or the PCF network element determines whether the S-NSSAI parameter and the DNN parameter can satisfy the application that is not associated with the session parameter of the first session.

In a fifth feasible implementation,
the PCF network element determines whether the S-NSSAI parameter, the DNN parameter and the SSC mode can satisfy the application that is not associated with the session parameter of the first session.

The foregoing feasible implementations are described below in detail through exemplary embodiments. It should be noted that, the first feasible implementation is described through the embodiment shown in FIG. 3, and the fourth feasible implementation is described through the embodiments shown in FIG. 4, FIG. 5A and FIG. 5B. For other feasible implementations, refer to the embodiments shown in FIG. 3 to FIG. 5A and FIG. 5B. Details are not described herein again.

Figure 4:
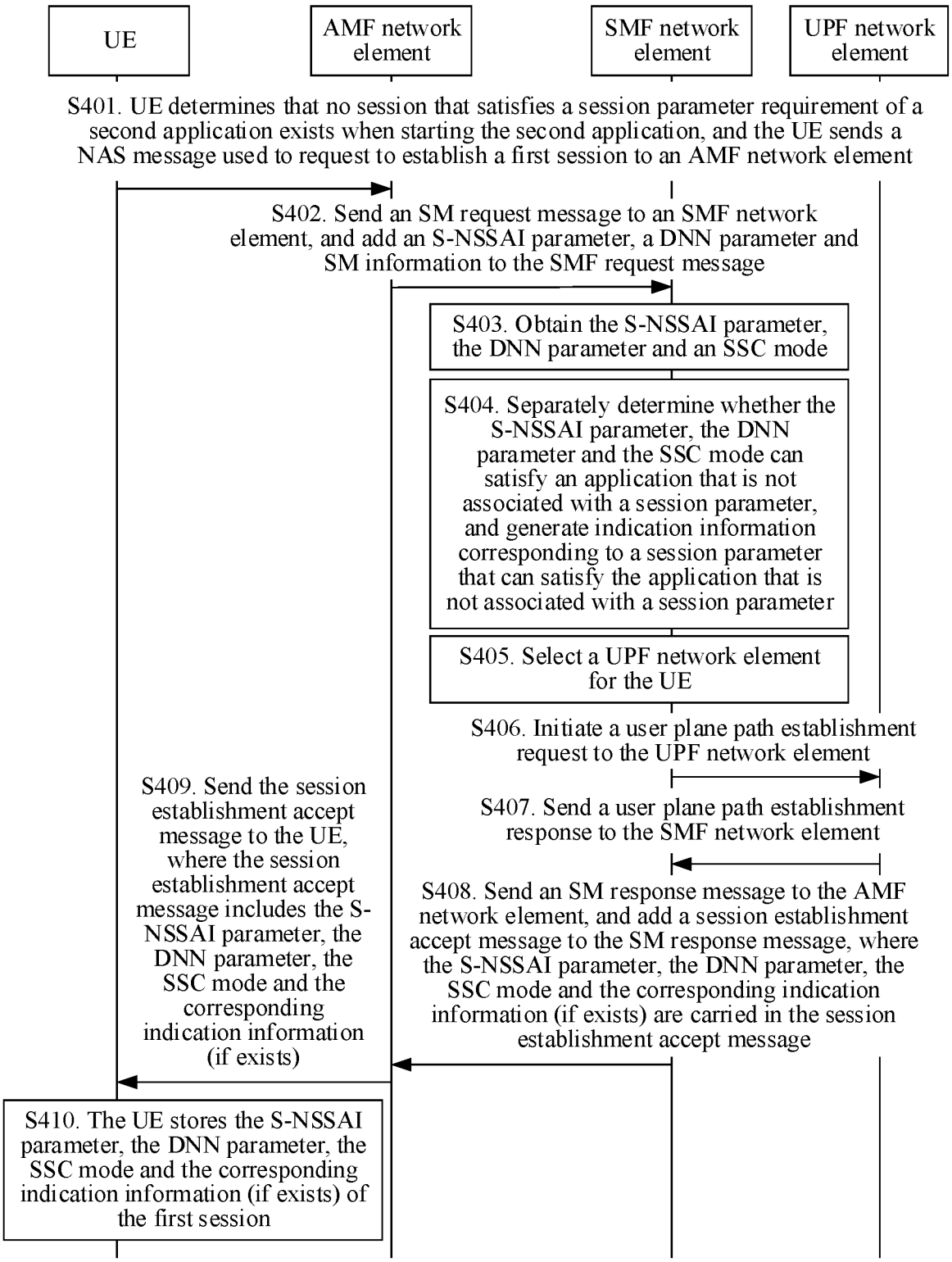
FIG. 4 is a first schematic flowchart of a method for establishing a first session according to this application.

FIG. 4 is a first schematic flowchart of a method for establishing a first session according to this application. In an embodiment shown in FIG. 4, an SMF network element determines whether an S-NSSAI parameter, a DNN parameter and an SSC mode can satisfy an application that is not associated with the session parameter of the first session. Referring to FIG. 4, the method may include the following steps.

S401. UE determines that no session that satisfies a session parameter requirement of a second application exists when starting the second application, and the UE sends a NAS message to an AMF network element, where the NAS message is used to request to establish a first session.

The NAS message includes an identifier of the first session and SM information.

Optionally, UE may add a session parameter of the second application to the NAS message. For example, the S-NSSAI parameter and/or the DNN parameter may be carried outside the SM information in the NAS message. Further, optionally, the SSC mode is carried inside the SM information in the NAS message.

Alternatively, the NAS message may not carry any of the foregoing session parameters of the second application.

S402. The AMF network element sends an SM request message to the SMF network element, and adds the S-NSSAI parameter, the DNN parameter and the SM information to the SM request message.

Optionally, the AMF network element determines whether the NAS message includes the S-NSSAI parameter and the DNN parameter. If the AMF network element determines that the NAS message includes the S-NSSAI parameter and the DNN parameter, the AMF network element selects, based on one or more of the identifier, the S-NSSAI parameter and the DNN parameter of the first session, the SMF network element and sends the S-NSSAI parameter, the DNN parameter and the SM information to the selected SMF network element.

If the AMF network element determines that the NAS message does not include the S-NSSAI parameter and/or the DNN parameter, the AMF network element obtains subscription data corresponding to the UE from a UDM network element, and obtains the S-NSSAI parameter and/or the DNN parameter based on the subscription data. It should be noted that, for a process of obtaining the S-NSSAI parameter and/or the DNN parameter by the AMF network element based on the subscription data, refer to the descriptions of S202. Details are not described herein again. Then, the AMF network element selects, based on one or more of the identifier, the S-NSSAI parameter and the DNN parameter of the first session, the SMF network element and sends the S-NSSAI parameter, the DNN parameter and the SM information to the selected SMF network element.

S403. The SMF network element obtains the S-NSSAI parameter, the DNN parameter and the SSC mode.

The S-NSSAI parameter and the DNN parameter are sent to the SMF network element by the AMF network element. Optionally, the SMF network element can determine whether the SM information includes the SSC mode. If the SM information includes the SSC mode, the SMF network element obtains the SSC mode in the SM information; and if the SM information does not include the SSC mode, the SMF network element can obtain the SSC mode based on subscription data. It should be noted that, for a process of obtaining the SSC mode by the SMF network element based on the subscription data, refer to the descriptions of S202. Details are not described herein again.

S404. The SMF network element separately determines whether the S-NSSAI parameter, the DNN parameter and the SSC mode can satisfy an application that is not associated with the session parameter of the first session, and generates indication information corresponding to a session parameter of the first session that can satisfy the application that is not associated with the session parameter of the first session.

For example, when determining that the S-NSSAI parameter can satisfy the application that is not associated with the session parameter of the first session, the SMF network element generates the indication information corresponding to the S-NSSAI parameter. When determining that the DNN parameter can satisfy the application that is not associated with the session parameter of the first session, the SMF network element generates the indication information corresponding to the DNN parameter. When determining that the SSC mode can satisfy the application that is not associated with the session parameter of the first session, the SMF network element generates the indication information corresponding to the SSC parameter.

Optionally, when determining that the S-NSSAI parameter, the DNN parameter and the SSC mode can all satisfy the application that is not associated with the session parameter of the first session, the SMF network element generates wildcard indication information corresponding to the first session.

It should be noted that, for the process of performing S404, refer to the descriptions of S203, and details are not described herein again.

S405. The SMF network element selects a UPF network element for the UE.

For example, the UPF network element may be the UPF network element 103 in FIG. 1.

S406. The SMF network element initiates a user plane path establishment request to the UPF network element.

S407. The UPF network element sends a user plane path establishment response to the SMF network element.

S408. The SMF network element sends an SM response message to the AMF network element, and adds a session establishment accept message to the SM response message. The S-NSSAI parameter, the DNN parameter, the SSC mode and corresponding indication information (if it exists) are carried in the session establishment accept message.

In other words, if the SMF network element generates the indication information corresponding to the S-NSSAI parameter for the S-NSSAI parameter in step S404, the indication information corresponding to the S-NSSAI parameter is carried in the session establishment accept message. Likewise, the indication information corresponding to the DNN parameter, and/or, the indication information corresponding to the SSC mode may be carried in the session establishment accept message. Alternatively, the wildcard indication information is carried in the session establishment accept message.

S409. The AMF network element sends the session establishment accept message to the UE, where the session establishment accept message includes the S-NSSAI parameter, the DNN parameter, the SSC mode, and the corresponding indication information (if it exists).

Optionally, the AMF network element may send a session request (N2 PDU Session Request) to a RAN network element and carry the session establishment accept message. The RAN network element initiates a radio resource setup (RAN-specific resource setup) with the UE based on the session request. In the radio resource setup process, the RAN sends the session establishment accept message to the UE.

S410. The UE stores the S-NSSAI parameter, the DNN parameter, the SSC mode and the corresponding indication information (if it exists) of the first session.

After S410, optionally, the RAN network element may send a session response (N2 PDU Session Response) to the AMF network element and carry RAN-side tunnel information. For example, the RAN-side tunnel information may include a RAN IP address and a RAN-side tunnel endpoint identifier. The AMF network element sends a session management request to the SMF network element and adds the RAN-side tunnel information to the session management request. The SMF network element initiates a user plane path modification request process, and in this process, the SMF network element sends the RAN-side tunnel information to the UPF network element. The SMF network element returns a session management response to the AMF network element.

In the embodiment shown in FIG. 4, in the process of establishing the first session, the SMF network element determines whether the S-NSSAI parameter, the DNN parameter and the SSC mode can satisfy the application that is not associated with the session parameter of the first session, generates the corresponding indication information, and integrates the determining function completely into the SMF network element, to facilitate maintenance of the function.

Figure 5A:
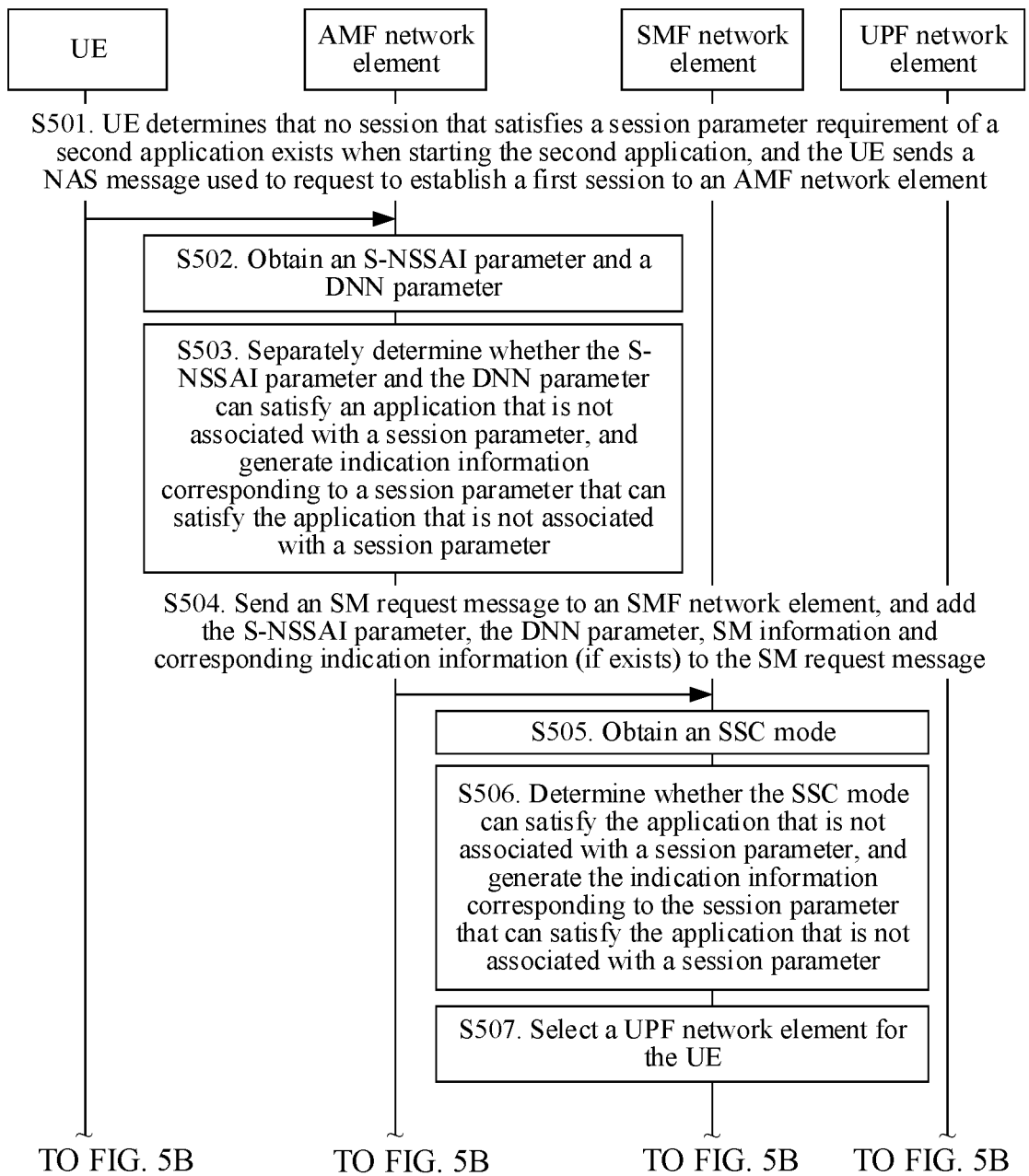
FIG. 5A and FIG. 5B are second schematic flowcharts of a method for establishing a first session according to this application.
Figure 5B:
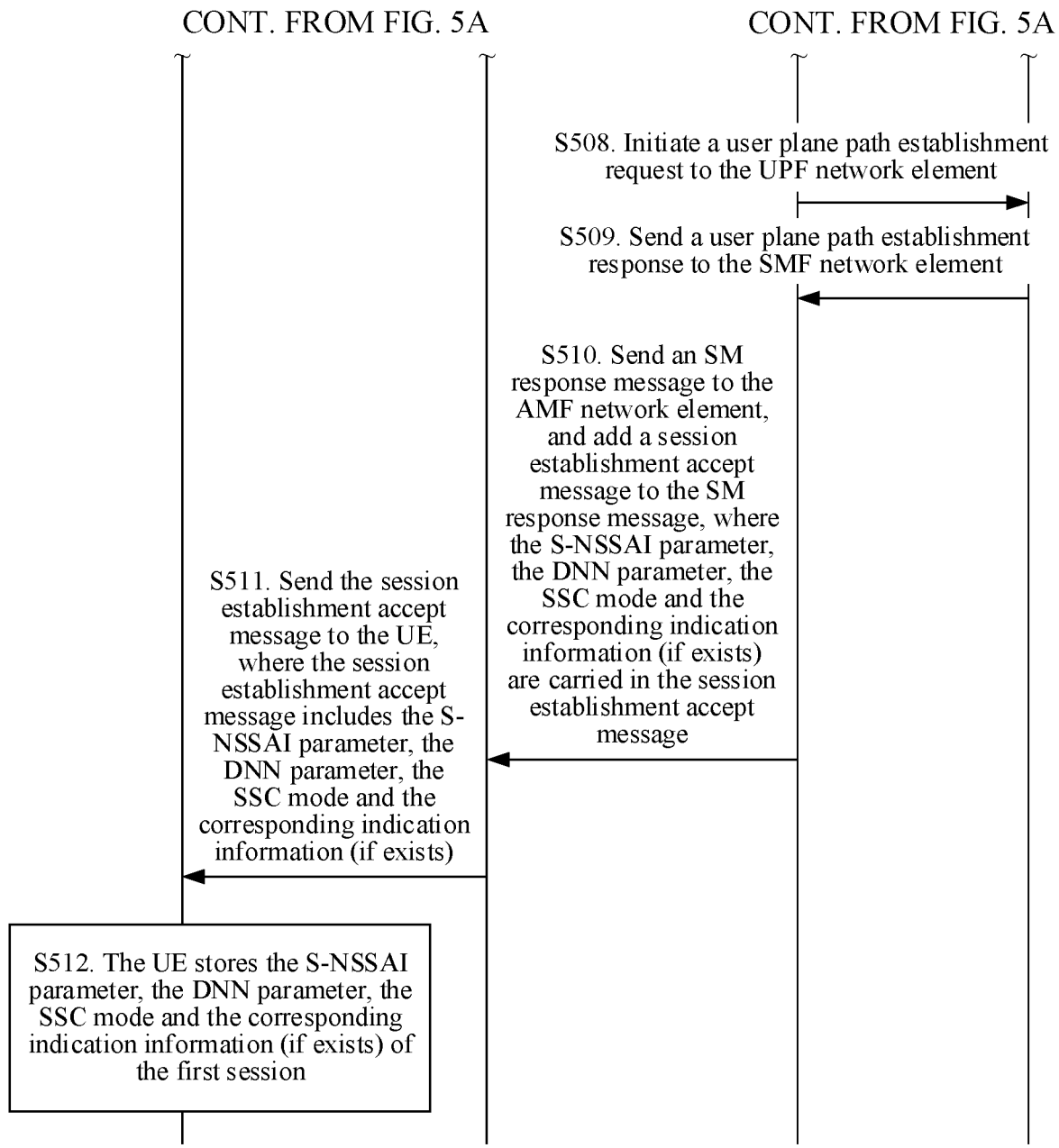

FIG. 5A and FIG. 5B are second schematic flowcharts of a method for establishing a first session according to this application. In an embodiment shown in FIG. 5A and FIG. 5B, an SMF network element determines whether an SSC mode can satisfy an application that is not associated with the session parameter of the first session, and an AMF network element determines whether an S-NSSAI parameter, a DNN parameter and an SSC mode can satisfy the application that is not associated with the session parameter of the first session. Referring to FIG. 5A and FIG. 5B, the method may include the following steps.

S501. UE determines that no session that satisfies a session parameter requirement of a second application exists when starting the second application, and the UE sends a NAS message to an AMF network element, where the NAS message is used to request to establish a first session.

It should be noted that for a process of performing S501, refer to S401, and details are not described herein again.

S502. The AMF network element obtains an S-NSSAI parameter and a DNN parameter.

Optionally, the AMF network element determines whether the NAS message includes the S-NSSAI parameter and the DNN parameter. If the NAS message includes the S-NSSAI parameter and the DNN parameter, the AMF network element obtains the S-NSSAI parameter and the DNN parameter; if the NAS message does not include the S-NSSAI parameter and the DNN parameter, the AMF network element obtains the S-NSSAI parameter and the DNN parameter based on subscription data. It should be noted that, for a process of obtaining the S-NSSAI parameter and the DNN parameter by the AMF network element based on the subscription data, refer to S202. Details are not described herein again.

It should be noted that the NAS message may alternatively include only one of the S-NSSAI parameter and the DNN parameter. Correspondingly, the AMF network element only needs to obtain a parameter that is not included in the NAS message based on the subscription data.

S503. The AMF network element separately determines whether the S-NSSAI parameter and the DNN parameter can satisfy the application that is not associated with the session parameter of the first session, and generates indication information corresponding to a session parameter of the first session that can satisfy the application that is not associated with the session parameter of the first session.

For example, when determining that the S-NSSAI parameter can satisfy the application that is not associated with the session parameter of the first session, the SMF network element generates the indication information corresponding to the S-NSSAI parameter. When determining that the DNN parameter can satisfy the application that is not associated with the session parameter of the first session, the SMF network element generates the indication information corresponding to the DNN parameter.

It should be noted that, for the process of performing S503, refer to the descriptions of S203, and details are not described herein again.

S504. The AMF network element sends an SM request message to the SMF network element and adds the S-NSSAI parameter, the DNN parameter, SM information and corresponding indication information (if it exists) to the SM request message.

It should be noted that if the AMF network element determines, in S503, that the S-NSSAI parameter can satisfy the application that is not associated with the session parameter of the first session, the indication information corresponding to the S-NSSAI parameter is carried in the SM request message; if the AMF network element determines, in S503, that the DNN parameter can satisfy the application that is not associated with the session parameter of the first session, the indication information corresponding to the DNN parameter is carried in the SM request message; and if the AMF network element determines that neither of the S-NSSAI parameter and the DNN parameter can satisfy the application that is not associated with the session parameter of the first session, the indication information is not carried in the SM request message.

S505. The SMF network element obtains an SSC mode.

Optionally, the SMF network element can determine whether the SM information includes the SSC mode. If the SM information includes the SSC mode, the SMF network element obtains the SSC mode in the SM information; and if the SM information does not include the SSC mode, the SMF network element can obtain the SSC mode based on subscription data. It should be noted that, for the process of obtaining the SSC mode by the SMF network element based on the subscription data, refer to S202. Details are not described herein again.

S506. The SMF network element determines whether the SSC mode can satisfy the application that is not associated with the session parameter of the first session, and generates indication information corresponding to the session parameter of the first session that can satisfy the application that is not associated with the session parameter of the first session.

When determining that the SCC mode can satisfy the application that is not associated with the session parameter of the first session, the SMF network element generates the indication information corresponding to the SCC mode; and otherwise, the SMF network element does not generate the indication information corresponding to the SCC mode.

When the SMF network element receives the indication information corresponding to the S-NSSAI parameter and the indication information corresponding to the DNN parameter that are sent by the AMF network element, and the SMF network element determines that the SSC mode can satisfy the application that is not associated with the session parameter of the first session, wildcard indication information corresponding to the first session is generated.

It should be noted that, for the process of performing S506, refer to the descriptions of S203, and details are not described herein again.

S507. The SMF network element selects a UPF network element for the UE.

S508. The SMF network element initiates a user plane path establishment request to the UPF network element.

S509. The UPF network element sends a user plane path establishment response to the SMF network element.

S510. The SMF network element sends an SM response message to the AMF network element, and adds a session establishment accept message to the SM response message. The S-NSSAI parameter, the DNN parameter, the SSC mode, and the corresponding indication information (if it exists) are carried in the session establishment accept message.

In other words, if the AMF network element generates the indication information corresponding to the S-NSSAI parameter for the S-NSSAI parameter, the indication information corresponding to the S-NSSAI parameter is carried in the session establishment accept message. Likewise, the indication information corresponding to the DNN parameter, and/or, the indication information corresponding to the SSC mode may be carried in the session establishment accept message. Alternatively, the wildcard indication information is carried in the session establishment accept message.

S511. The AMF network element sends the session establishment accept message to the UE, where the session establishment response message includes the S-NSSAI parameter, the DNN parameter, the SSC mode and the corresponding indication information (if it exists).

It should be noted that for a process of performing S511, refer to S409, and details are not described herein again.

S512. The UE stores the S-NSSAI parameter, the DNN parameter, the SSC mode and the corresponding indication information of the first session.

It should be noted that for a process of performing S512, refer to S410, and details are not described herein again.

In the embodiment shown in FIG. 5A and FIG. 5B, in the process of establishing the first session, the SMF network element determines whether the SSC mode can satisfy the application that is not associated with the session parameter of the first session, and the AMF network element determines whether the S-NSSAI parameter, the DNN parameter and the SSC mode can satisfy the application that is not associated with the session parameter of the first session. The determining function is distributed in the SMF network element and the AMF network element, thereby alleviating load of each network element.

Figure 6A:
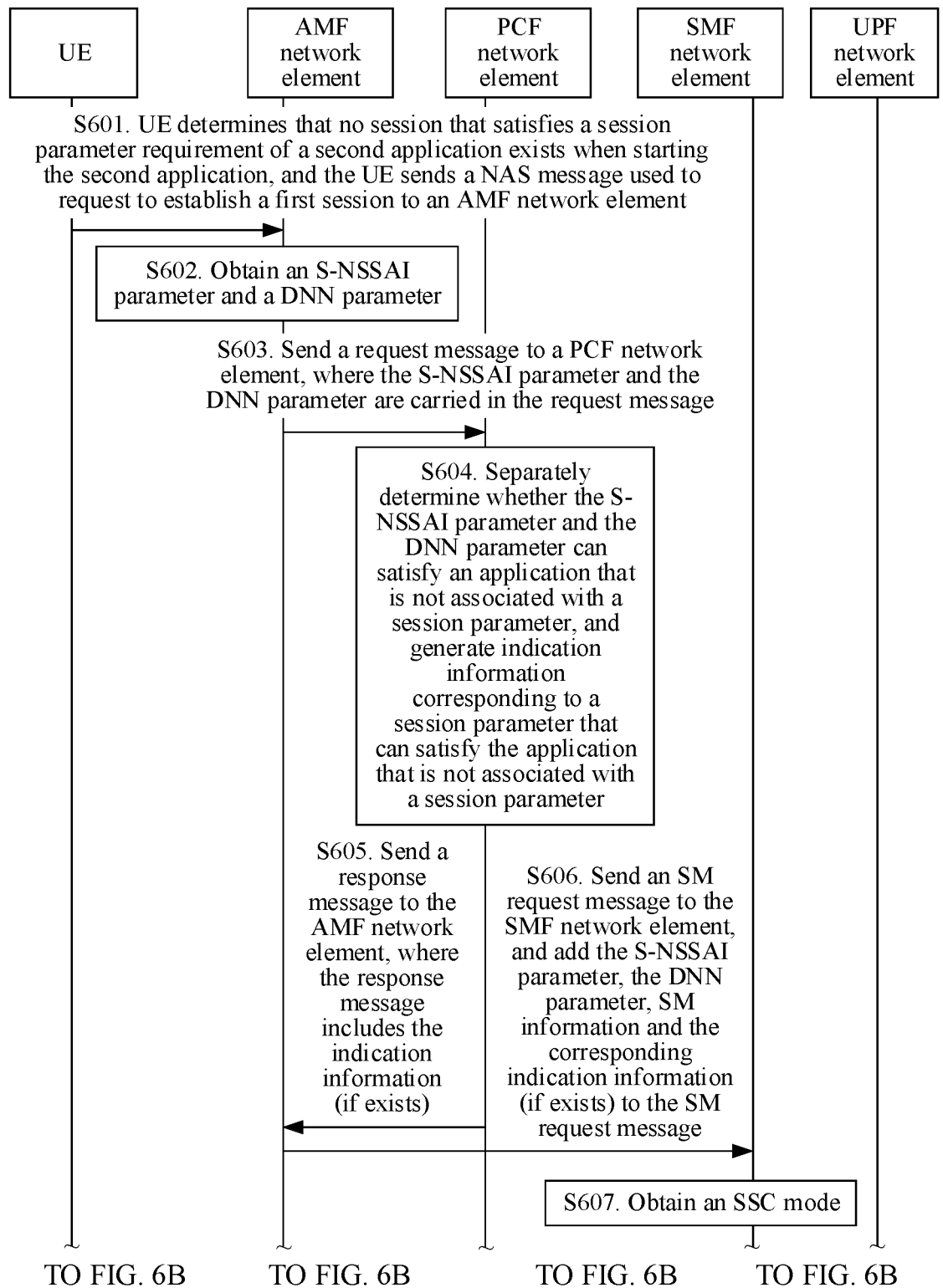
FIG. 6A and FIG. 6B are third schematic flowcharts of a method for establishing a first session according to this application.
Figure 6B:
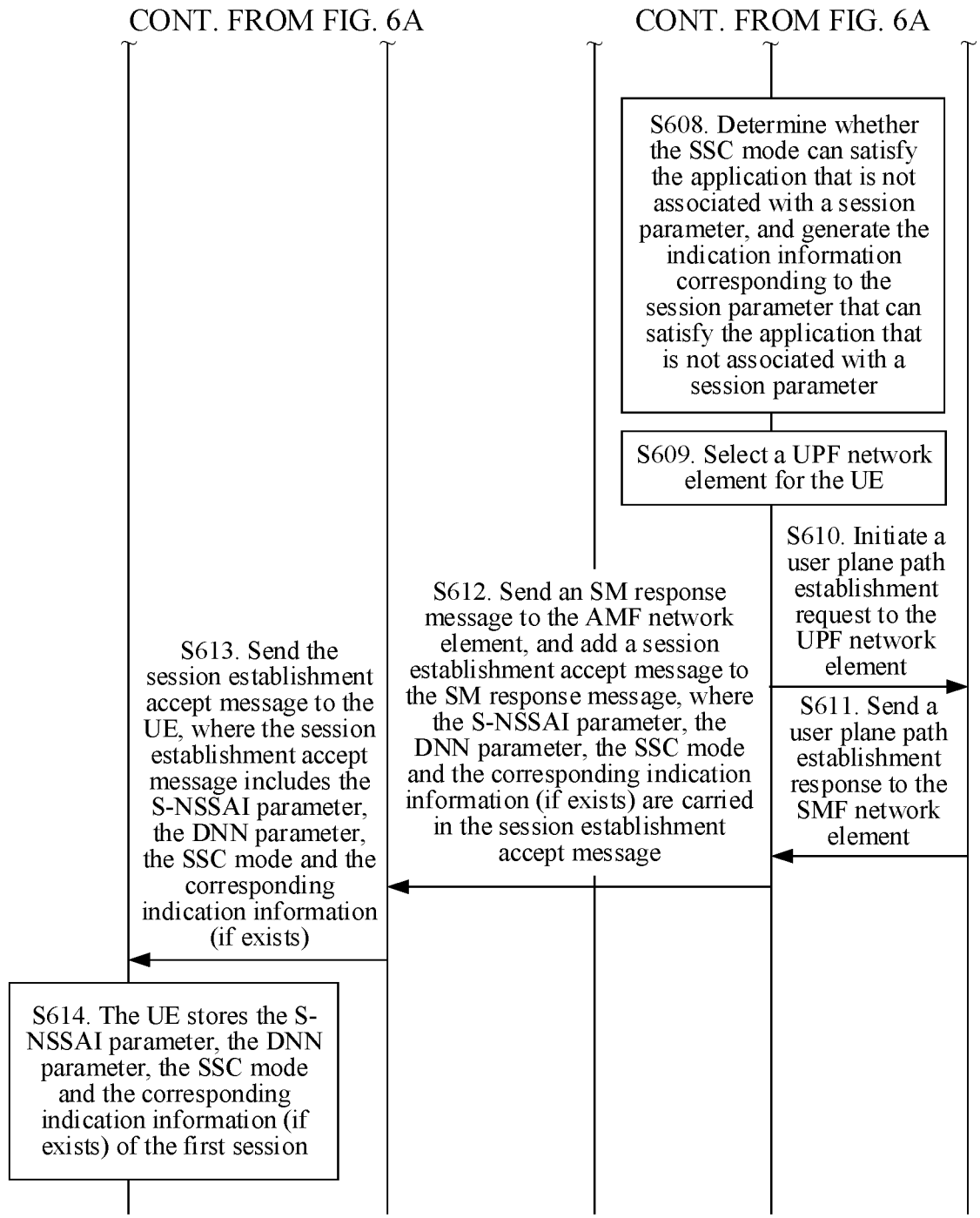

FIG. 6A and FIG. 6B are third schematic flowcharts of a method for establishing a first session according to this application. In an embodiment shown in FIG. 6A and FIG. 6B, an SMF network element determines whether an SSC mode can satisfy an application that is not associated with the session parameter of the first session, and a PCF network element determines whether an S-NSSAI parameter and a DNN parameter can satisfy the application that is not associated with the session parameter of the first session. Referring to FIG. 6A and FIG. 6B, the method may include the following steps.

S601. UE determines that no session that satisfies a session parameter requirement of a second application exists when starting the second application, and the UE sends a NAS message to an AMF network element, where the NAS message is used to request to establish a first session.

It should be noted that for a process of performing S601, refer to S401, and details are not described herein again.

S602. The AMF network element obtains an S-NSSAI parameter and a DNN parameter.

Optionally, the AMF network element determines whether the NAS message includes the S-NSSAI parameter and the DNN parameter; if the NAS message includes the S-NSSAI parameter and the DNN parameter, the AMF network element obtains the S-NSSAI parameter and the DNN parameter in the NAS message; and if the NAS message does not include the S-NSSAI parameter and the DNN parameter, the AMF network element obtains the S-NSSAI parameter and the DNN parameter based on subscription data. It should be noted that, for a process of obtaining the S-NSSAI parameter and the DNN parameter by the AMF network element based on the subscription data, refer to S202. Details are not described herein again.

It should be noted that the NAS message may alternatively include only one of the S-NSSAI parameter and the DNN parameter. Correspondingly, the AMF network element only needs to obtain a parameter that is not included in the NAS message based on the subscription data.

S603. The AMF network element sends a request message to the PCF network element, where the S-NSSAI parameter and the DNN parameter are carried in the request message.

S604. The PCF network element separately determines whether the S-NSSAI parameter and the DNN parameter can satisfy an application that is not associated with the session parameter of the first session, and generates indication information corresponding to a session parameter of the first session that can satisfy the application that is not associated with the session parameter of the first session.

For example, when determining that the S-NSSAI parameter can satisfy the application that is not associated with the session parameter of the first session, the PCF network element generates the indication information corresponding to the S-NSSAI parameter. When determining that the DNN parameter can satisfy the application that is not associated with the session parameter of the first session, the PCF network element generates the indication information corresponding to the DNN parameter.

It should be noted that, for the process of performing S604, refer to the descriptions of S203, and details are not described herein again.

S605. The PCF network element sends a response message to the AMF network element, where the response message includes the indication information (if it exists).

It should be noted that if the PCF network element determines, in S604, that the S-NSSAI parameter can satisfy the application that is not associated with the session parameter of the first session, the indication information corresponding to the S-NSSAI parameter is carried in the response message; if the PCF network element determines, in S604, that the DNN parameter can satisfy the application that is not associated with the session parameter of the first session, the indication information corresponding to the DNN parameter is carried in the response message; and if the PCF network element determines that neither of the S-NSSAI parameter and the DNN parameter can satisfy the application that is not associated with, the indication information is not carried in the response message.

S606. The AMF network element sends an SM request message to the SMF network element, and adds the S-NSSAI parameter, the DNN parameter, SM information and corresponding indication information (if it exists) to the SM request message.

It should be noted that, when the PCF network determines that neither of the S-NSSAI parameter and the DNN parameter can satisfy the application that is not associated with the session parameter of the first session, the indication information is not carried in the SM request message.

S607. The SMF network element obtains an SSC mode.

It should be noted that for a process of performing S607, refer to S505, and details are not described herein again.

S608. The SMF network element separately determines whether the SSC mode can satisfy the application that is not associated with the session parameter of the first session, and generates indication information corresponding to a session parameter of the first session that can satisfy the application that is not associated with the session parameter of the first session.

It should be noted that for a process of performing S608, refer to S506, and details are not described herein again.

S609. The SMF network element selects a UPF network element for the UE.

S610. The SMF network element initiates a user plane path establishment request to the UPF network element.

S611. The UPF network element sends a user plane path establishment response to the SMF network element.

S612. The SMF network element sends an SM response message to the AMF network element, and adds a session establishment accept message to the SM response message. The S-NSSAI parameter, the DNN parameter, the SSC mode and the corresponding indication information (if it exists) are carried in the session establishment accept message.

In other words, if the PCF network element generates the indication information corresponding to the S-NSSAI parameter for the S-NSSAI parameter, the indication information corresponding to the S-NSSAI parameter is carried in the session establishment accept message. Likewise, the indication information corresponding to the DNN parameter, and/or, the indication information corresponding to the SSC mode may be carried in the session establishment accept message. Alternatively, the wildcard indication information is carried in the session establishment accept message.

S613. The AMF network element sends the session establishment accept message to the UE, where the session establishment accept message includes the S-NSSAI parameter, the DNN parameter, the SSC mode and the corresponding indication information (if it exists).

It should be noted that for a process of performing S613, refer to S409, and details are not described herein again.

S614. The UE stores the S-NSSAI parameter, the DNN parameter, the SSC mode and the corresponding indication information of the first session.

It should be noted that for a process of performing S614, refer to S410, and details are not described herein again.

In the embodiment shown in FIG. 6A and FIG. 6B, in the process of establishing the first session, the SMF network element determines whether the SSC mode can satisfy the application that is not associated with the session parameter of the first session, and the PCF network element determines whether the S-NSSAI parameter, and the DNN parameter can satisfy the application that is not associated with the session parameter of the first session. The determining function is distributed in the SMF network element and the PCF network element, thereby alleviating load of each network element.

Another session processing method is described in detail below through the embodiments shown in FIG. 7 and FIG. 8.

Figure 7:
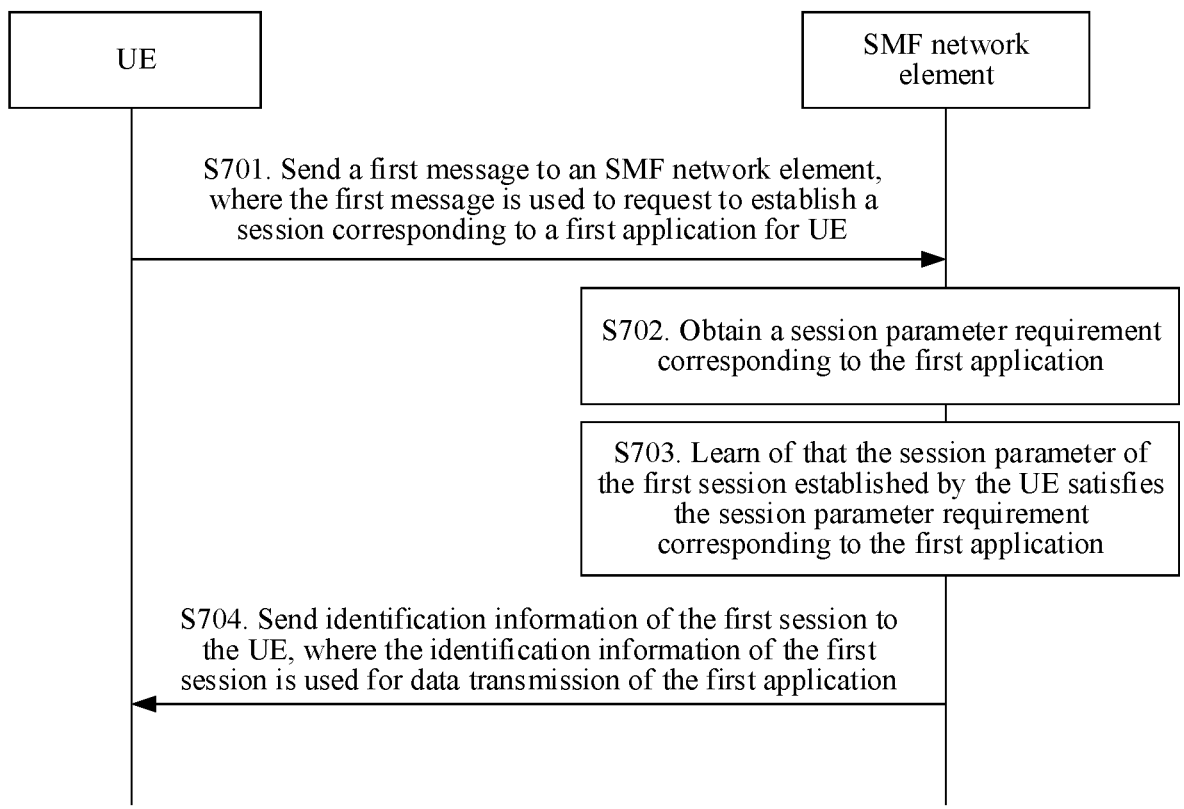
FIG. 7 is a third schematic diagram of a session processing method according to this application.

FIG. 7 is a third schematic diagram of a session processing method according to this application. Referring to FIG. 7, the method may include the following steps.

S701. UE sends a first message to an SMF network element, where the first message is used to request to establish a session corresponding to a first application for the UE.

When the UE needs to establish the session for the first application, for example, the UE starts the first application or, when the UE needs to transmit data of the first application and no session corresponding to the first application exists in the UE, the UE sends the first message to the SMF network element through aRAN network element, and an AMF network element.

The first message received by the SMF network element includes an S-NSSAI parameter and a DNN parameter. Optionally, the S-NSSAI parameter and the DNN parameter in the first message may be obtained through determining by the UE, or may be obtained through determining by the AMF network element.

S702. The SMF network element obtains a session parameter requirement corresponding to the first application.

The session parameter requirement corresponding to the first application is a session parameter corresponding to the first application. For example, assuming that the DNN parameter corresponding to the first application is DNN-1, a DNN parameter requirement of the first application is DNN-1.

Optionally, the SMF network element may obtain the S-NSSAI parameter and the DNN parameter that correspond to the first application in the first message. The SMF network element determines whether SM information in the first message includes an SSC mode; if the SM information in the first message includes the SSC mode, the SSC mode is obtained in the SM information; and if the SM information in the first message does not include the SSC mode, the SSC mode is obtained based on subscription data corresponding to the UE. It should be noted that for a process of obtaining the SSC mode by the SMF network element based on the subscription data, refer to S202, and details are not described herein again.

S703. The SMF network element learns of that the session parameter of the first session established by the UE satisfies the session parameter requirement corresponding to the first application.

Optionally, the SMF network element may request the UE or the database (for example, the UDSF 109 in FIG. 1) for all sessions established by the UE, and for session parameters of all the sessions established by the UE, and determine whether the session parameters of all the established sessions satisfy the session parameter requirement corresponding to the first application.

The session parameter includes at least one of a network slice identifier, a data network identifier, and a service and session continuity SSC mode. Assuming that the SMF network element determines that the session parameter of the first session established by the UE satisfies the session parameter requirement corresponding to the first application, that is, the SMF network element learns of that the session parameter of the first session is correspondingly the same as the session parameter requirement corresponding to the first application, the SMF network element sends identification information of the first session to the UE, so that the UE transmits the data of the first application through the first session.

S704. The SMF network element sends the identification information of the first session to the UE, where the identification information of the first session is used for data transmission of the first application.

In the embodiment shown in FIG. 7, after starting the first application, the UE directly requests a network side device to establish a session for the first application. In the process of establishing the session by the network device for the first application, it is determined whether the session parameter of the established session in the UE can satisfy the session parameter requirement corresponding to the first application. If the session parameter of the established session in the UE can satisfy the session parameter requirement corresponding to the first application, the network side device refuses to establish a new session for the first application, and instead, sends an identifier of the established session to the UE, so that the UE transmits the data of the first application based on the established session. In this way, there is no need to establish a new session for the first application, thereby saving signaling overhead and reducing a quantity of sessions on the terminal.

The method shown in the embodiment of FIG. 7 is further described in detail below through the embodiment shown in FIG. 8.

Figure 8:
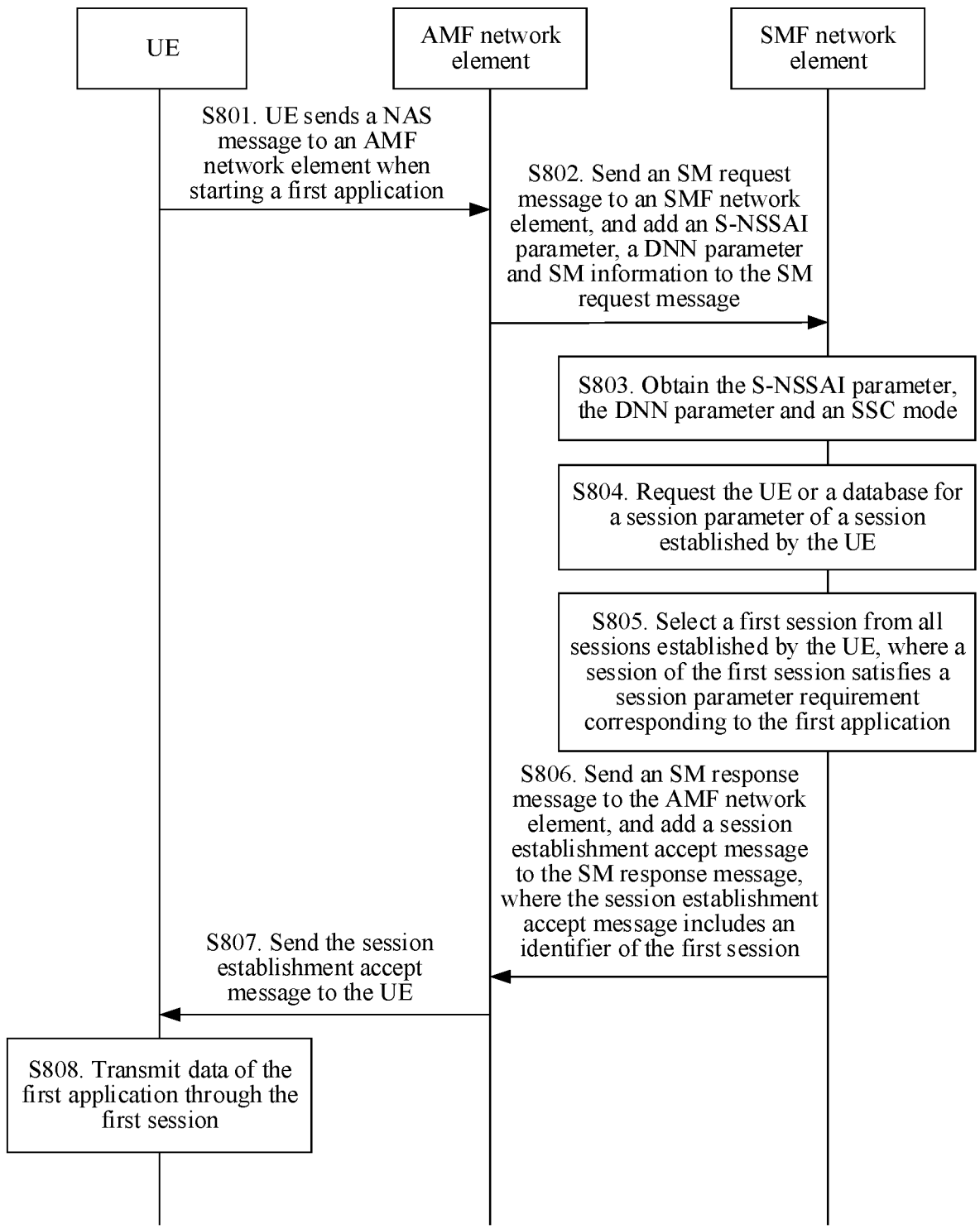
FIG. 8 is a fourth schematic diagram of a session processing method according to this application.

FIG. 8 is a fourth schematic diagram of a session processing method according to this application. Based on the embodiment shown in FIG. 7, referring to FIG. 8, the method may include the following steps.

S801. UE sends a NAS message to an AMF network element when starting a first application.

Optionally, the NAS message includes an identifier of a session that needs to be established and SM information.

Optionally, if the UE can obtain a session parameter of the first application locally, the UE can add the session parameter of the first application to the NAS message. For example, if the UE can obtain an S-NSSAI parameter and/or a DNN parameter of the first application locally, the S-NSSAI parameter and/or the DNN parameter may be carried outside the SM information in the NAS message; and if the UE can obtain the SSC mode of the first application locally, the SSC mode may be carried inside the SM information in the NAS message.

Certainly, if the UE cannot obtain the session parameter of the first application locally, the session parameter of the first application may be not carried in the NAS message.

S802. The AMF network element sends an SM request message to an SMF network element, and adds the S-NSSAI parameter, the DNN parameter and the SM information to the SM request message.

It should be noted that for a process of performing S802, refer to S302, and details are not described herein again.

S803. The SMF network element obtains the S-NSSAI parameter, the DNN parameter and the SSC mode.

It should be noted that for a process of performing S803, refer to S303, and details are not described herein again.

S804. The SMF network element requests the UE or the database for the session parameter of the session established by the UE.

It should be noted that a plurality of SMF network elements can interact with the database. When each SMF network element completes establishing a session, a session parameter of the session is stored into the database, so that the SMF network element can obtain, in the database, the session parameter of the session established by the UE.

S805. The SMF network element selects a first session from all sessions established by the UE, where a session parameter of the first session satisfies a session parameter requirement corresponding to the first application.

S806. The SMF network element sends an SM response message to the AMF network element, and adds a session establishment accept message to the SM response message. The session establishment accept message includes an identifier of the first session.

Optionally, the session establishment accept message may further include a reason for redirecting a session. The reason for redirecting a session may be represented by a preset value or a preset character.

S807. The AMF network element sends the session establishment accept message to the UE.

Optionally, the AMF network element may send the session establishment accept message to the UE through a RAN network element.

S808. The UE transmits data of the first application through the first session.

In the embodiment shown in FIG. 8, in the process of establishing the session corresponding to the first application by the SMF network element for the UE, if it is determined that the session parameter of the first session established in the UE can satisfy the session parameter requirement corresponding to the first application, the SMF network element refuses to establish a new session for the first application, and instead, sends the identifier of the first session to the UE, so that the UE transmits the data of the first application based on the first session. In this way, there is no need to establish a new session for the first application, thereby saving signaling overhead and reducing a quantity of sessions on the terminal.

Figure 9:
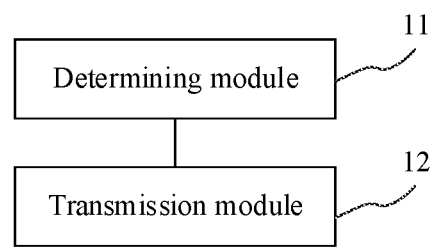
FIG. 9 is a schematic structural diagram of a session processing apparatus according to this application.

FIG. 9 is a schematic structural diagram of a session processing apparatus according to this application. The session processing apparatus may be disposed in UE. Referring to FIG. 9, the apparatus may include a determining module 11, and a transmission module 12.

The determining module 11 is configured to determine that a first application is not associated with the session parameter of a first session when terminal device UE starts the first application. The determining module 11 can perform S206 in the embodiment of FIG. 2. For the execution process and corresponding beneficial effects, refer to the descriptions in S206. Details are not described herein again.

The transmission module 12 is configured to transmit data of the first application through the first session in response to the UE obtaining indication information, where the indication information indicates that a session parameter of the first session can satisfy an application that is not associated with the session parameter of the first session. The transmission module 12 can perform S207 in the embodiment of FIG. 2. For the execution process and corresponding beneficial effects, refer to the descriptions in S207. Details are not described herein again.

It should be noted that, the session processing apparatus shown in this application can perform technical solutions shown in the embodiments of FIG. 2 to FIG. 6A and FIG. 6B. Implementation principles and beneficial effects of the technical solutions are similar, and details are not described herein again.

In a possible implementation, when the session parameter of the first session with which the first application is not associated is a network slice identifier, the transmission module 12 is configured to transmit the data of the first application by using a network slice corresponding to a network slice identifier of the first session.

When the session parameter of the first session with which the first application is not associated is a data network identifier, the transmission module 12 is configured to transmit the data of the first application by using a data network corresponding to a data network identifier of the first session.

When the session parameter of the first session with which the first application is not associated is a service and session continuity SSC mode, the transmission module 12 is configured to transmit the data of the first application based on an SSC mode of the first session.

It should be noted that, the session processing apparatus shown in this application can perform technical solutions shown in the embodiments of FIG. 2 to FIG. 6A and FIG. 6B. Implementation principles and beneficial effects of the technical solutions are similar, and details are not described herein again.

Figure 10:
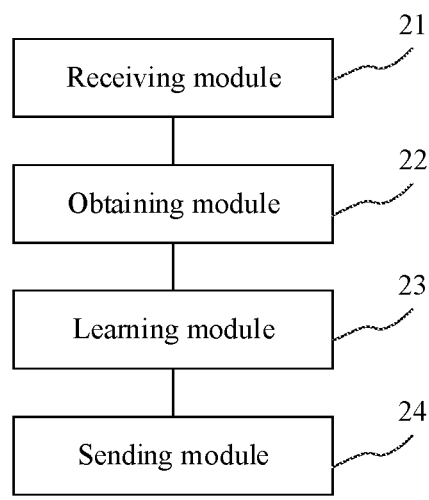
FIG. 10 is a schematic structural diagram of another session processing apparatus according to this application.

FIG. 10 is a schematic structural diagram of another session processing apparatus according to this application. The session processing apparatus may be disposed in a CP network element, and the CP network element may be an AMF network element or an SMF network element. Referring to FIG. 10, the apparatus includes a receiving module 21, an obtaining module 22, a learning module 23 and a sending module 24.

The receiving module 21 is configured to receive a first message, and the first message is used to request to establish a first session. The receiving module 21 can perform S201 in the embodiment shown in FIG. 2, S401 in the embodiment shown in FIG. 4, S501 in the embodiment shown in FIG. 5A and S601 in the embodiment shown in FIG. 6A. For the execution process and corresponding beneficial effects, refer to the descriptions in S401, S501 and S601. Details are not described herein again.

The obtaining module 22 is configured to obtain a session parameter of the first session. The obtaining module can perform S202 in the embodiment shown in FIG. 2, S403 in the embodiment shown in FIGS. 4, S502 and S505 in the embodiment shown in FIG. 5A, and S602 and S607 in the embodiment shown in FIG. 6A. Details are not described herein again.

The learning module 23 is configured to learn of that the session parameter of the first session can satisfy an application that is not associated with the session parameter of the first session. The learning module can perform descriptions of S203 in the embodiment shown in FIG. 2, S404 in the embodiment shown in FIGS. 4, S503 and S506 in the embodiment shown in FIG. 5A, and S604 and S608 in the embodiment shown in FIG. 6A and FIG. 6B. Details are not described herein again.

The sending module 24 is configured to send indication information to terminal device UE, where the indication information indicates that the session parameter of the first session can satisfy the application that is not associated with the session parameter of the first session. The sending module can perform descriptions of S204 in the embodiment shown in FIGS. 2, S408 and S409 in the embodiment shown in FIGS. 4, S510 and S511 in the embodiment shown in FIG. 5B, and S612 and S613 in the embodiment shown in FIG. 6B. Details are not described herein again.

It should be noted that, the session processing apparatus shown in this application can perform technical solutions shown in the embodiments of FIG. 2 to FIG. 6A and FIG. 6B. Implementation principles and beneficial effects of the technical solutions are similar, and Details are not described herein again.

In a possible implementation, when the CP network element is an access and mobility management function AMF network element, the learning module 23 is configured to:

determine that the session parameter of the first session can satisfy the application that is not associated with the session parameter of the first session, where the session parameter of the first session includes at least one of a network slice identifier and a data network identifier;

or, send a first request message to a policy control function PCF network element, and receive a first response message from the PCF network element, where the first response message includes the indication information, and the session parameter of the first session includes at least one of a network slice identifier and a data network identifier;

or, send a second request message to a session management function SMF network element, and receive a second response message from the SMF network element, where the second response message includes the indication information, and the session parameter of the first session includes at least one of a network slice identifier, a data network identifier, and a service and session continuity SSC mode.

In another possible implementation, the sending module 24 is further configured to send the indication information to the SMF network element after the learning module 23 learns of that the session parameter of the first session can satisfy the application that is not associated with the session parameter of the first session.

In another possible implementation, the CP network element is an SMF network element and the learning module 23 is configured to:

determine that the session parameter of the first session can satisfy the application that is not associated with the session parameter of the first session, where the session parameter of the first session includes at least one of a network slice identifier, a data network identifier, and an SSC mode;

or, send a third request message to a PCF network element, and receive a third response message from the PCF network element, where the third response message includes the indication information, and the session parameter of the first session includes at least one of an identifier of a network slice identifier, a data network identifier, and an SSC mode.

In another possible implementation, the learning module 23 is configured to:

determine that the session parameter of the first session can satisfy the application that is not associated with the session parameter based on a service type corresponding to the first session;

or, determine that the session parameter of the first session can satisfy the application that is not associated with the session parameter of the first session based on an application identifier corresponding to the first session;

or, determine that the session parameter of the first session can satisfy the application that is not associated with the session parameter of the first session based on subscription data or a local policy.

It should be noted that, the session processing apparatus shown in this application can perform technical solutions shown in the embodiments of FIG. 2 to FIG. 6A and FIG. 6B. Implementation principles and beneficial effects of the technical solutions are similar, and details are not described herein again.

Figure 11:
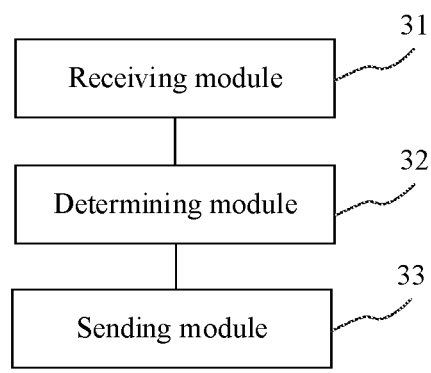
FIG. 11 is a schematic structural diagram of still another session processing apparatus according to this application.

FIG. 11 is a schematic structural diagram of still another session processing apparatus according to this application. The apparatus may be disposed in a PCF network element. Referring to FIG. 11, the apparatus may include a receiving module 31, a determining module 32, and a sending module 33.

The receiving module 31 is configured to receive a request message from a control plane CP network element, where the request message includes a session parameter of a first session. The receiving module 31 can perform S301 in the embodiment shown in FIG. 3. For the execution process and corresponding beneficial effects, refer to the descriptions in S301. Details are not described herein again.

The determining module 32 is configured to determine that the session parameter of the first session can satisfy an application that is not associated with the session parameter of the first session. The determining module 32 can perform S302 in the embodiment shown in FIG. 3. For the execution process and corresponding beneficial effects, refer to the descriptions in S302. Details are not described herein again.

The sending module 33 is configured to send a response message to the CP network element, where the response message indicates that the session parameter of the first session can satisfy the application that is not associated with the session parameter of the first session. The sending module 33 can perform S303 in the embodiment shown in FIG. 3. For the execution process and corresponding beneficial effects, refer to the descriptions in S303. Details are not described herein again.

It should be noted that, the session processing apparatus shown in this application can perform technical solutions shown in the embodiments of FIG. 3, FIG. 6A and FIG. 6B. Implementation principles and beneficial effects of the technical solutions are similar, and details are not described herein again.

Figure 12:
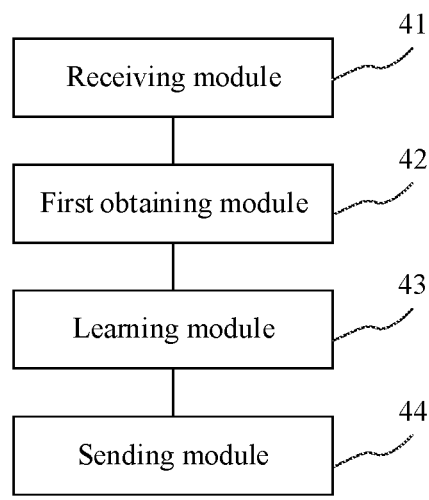
FIG. 12 is a first schematic structural diagram of yet another session processing apparatus according to this application.

FIG. 12 is a first schematic structural diagram of yet another session processing apparatus according to this application. The apparatus may be disposed in an SMF network element. Referring to FIG. 12, the apparatus may include a receiving module 41, a first obtaining module 42, a learning module 43 and a sending module 44.

The receiving module 41 is configured to receive a first message from terminal device UE, where the first message is used to request to establish a session corresponding to a first application for the UE. The receiving module 41 can perform S701 in the embodiment shown in FIG. 7, and S801 in the embodiment shown in FIG. 8. For the execution process and corresponding beneficial effects, refer to the descriptions in S701, and S801. Details are not described herein again.

The first obtaining module 42 is configured to obtain a session parameter requirement corresponding to the first application. The first obtaining module 42 can perform S702 in the embodiment shown in FIG. 7, and S803 in the embodiment shown in FIG. 8. For the execution process and corresponding beneficial effects, refer to the descriptions in S702, and S803. Details are not described herein again.

The learning module 43 is configured to learn of that a session parameter of a first session established by the UE satisfies the session parameter requirement corresponding to the first application. The learning module 43 can perform S703 in the embodiment shown in FIG. 7, and S804 and S805 in the embodiment shown in FIG. 8. For the execution process and corresponding beneficial effects, refer to the descriptions in S703, and S804 and S805. Details are not described herein again.

The sending module 44 is configured to send identification information of the first session to the UE, where the identification information of the first session is used for data transmission of the first application. The sending module 44 can perform S704 in the embodiment shown in FIG. 7, and S806 and S807 in the embodiment shown in FIG. 8. For the execution process and corresponding beneficial effects, refer to the descriptions in S704, S806 and S807. Details are not described herein again.

It should be noted that, the session processing apparatus shown in this application can perform technical solutions shown in the embodiments of FIG. 7 and FIG. 8. Implementation principles and beneficial effects of the technical solutions are similar, and details are not described herein again.

Figure 13:
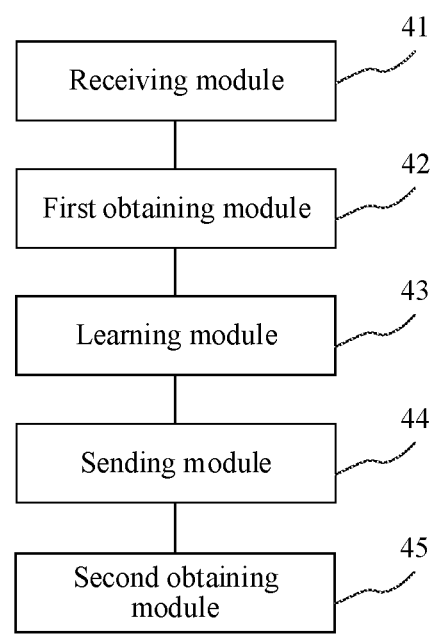
FIG. 13 is a second schematic structural diagram of yet another session processing apparatus according to this application.

FIG. 13 is a second schematic structural diagram of yet another session processing apparatus according to this application. Based on the embodiment shown in FIG. 12, referring to FIG. 13, the apparatus further includes a second obtaining module 45.

The second obtaining module 45 is configured to request the UE for the session parameter of the first session before the sending module 44 sends the identification information of the first session to the UE; or obtain the session parameter of the first session from a database. The sending module 44 can perform S804 in the embodiment shown in FIG. 8. For the execution process and corresponding beneficial effects, refer to the descriptions in S804. Details are not described herein again.

In a possible implementation, the learning module 43 is configured to:

learn of that the session parameter of the first session is correspondingly the same as the session parameter requirement corresponding to the first application, where the session parameter includes at least one of a network slice identifier, a data network identifier, and a service and session continuity SSC mode.

It should be noted that, the session processing apparatus shown in this application can perform technical solutions shown in the embodiments of FIG. 7 and FIG. 8. Implementation principles and beneficial effects of the technical solutions are similar, and details are not described herein again.

Figure 14:
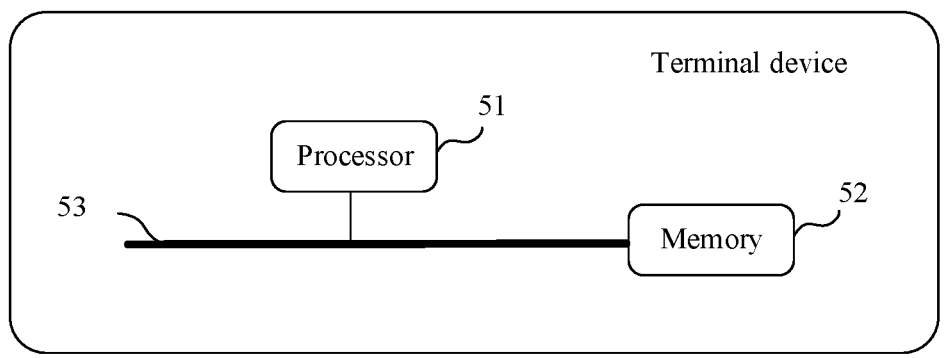
FIG. 14 is a schematic structural diagram of a terminal device according to this application.

FIG. 14 is a schematic structural diagram of a terminal device according to this application. Referring to FIG. 14, the terminal device includes a processor 51, a memory 52, and a communications bus 53, where the communications bus 53 is configured to implement a connection between components, the memory 52 is configured to store a program instruction, and the processor 51 is configured to: read the program instruction in the memory 52, and perform the methods shown in the embodiments of FIG. 2 to FIG. 6A and FIG. 6B according to the program instruction in the memory. Optionally, the processor 51 can perform other processes of the terminal device other than information transceiving in the embodiments of FIG. 2 to FIG. 6A and FIG. 6B. The implementation principles and beneficial effects thereof are similar, and details are not described herein again.

Figure 15:
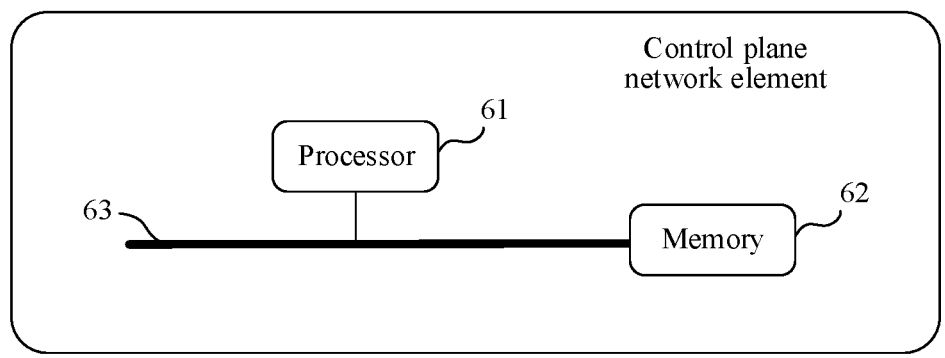
FIG. 15 is a schematic structural diagram of a control plane network element according to this application.

FIG. 15 is a schematic structural diagram of a control plane network element according to this application. Referring to FIG. 15, the control plane network element includes a processor 61, a memory 62, and a communications bus 63, where the communications bus 63 is configured to implement a connection between components, the memory 62 is configured to store a program instruction, and the processor 61 is configured to: read the program instruction in the memory 62, and perform the methods shown in the embodiments of FIG. 2 to FIG. 6A and FIG. 6B according to the program instruction in the memory 62. Optionally, the processor 61 can perform other processes of the control plane network element other than information transceiving in the embodiments of FIG. 2 to FIG. 6A and FIG. 6B. The implementation principles and beneficial effects thereof are similar, and details are not described herein again.

Figure 16:
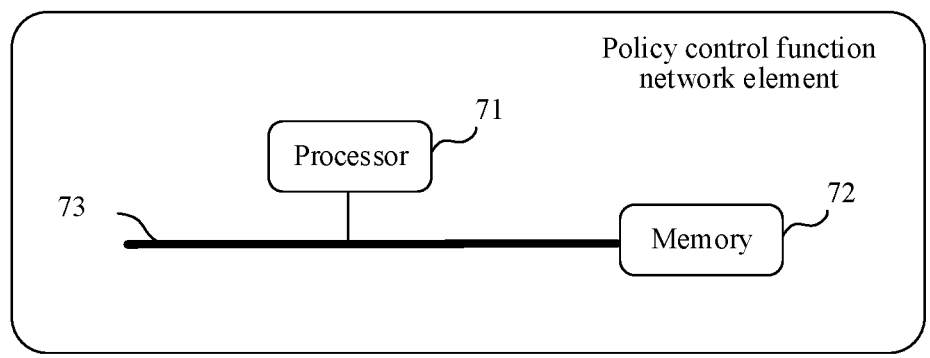
FIG. 16 is a schematic structural diagram of a policy control function network element according to this application.

FIG. 16 is a schematic structural diagram of a policy control function network element according to this application. Referring to FIG. 16, the policy control function network element includes a processor 71, a memory 72, and a communications bus 73, where the communications bus 73 is configured to implement a connection between components, the memory 72 is configured to store a program instruction, and the processor 71 is configured to: read the program instruction in the memory 72, and perform the methods shown in the embodiments of FIG. 3, FIG. 6A and FIG. 6B according to the program instruction in the memory 72. Optionally, the processor 71 can perform other processes of the policy control function network element other than information transceiving in the embodiments of FIG. 3, FIG. 6A and FIG. 6B. The implementation principles and beneficial effects thereof are similar, and details are not described herein again.

Figure 17:
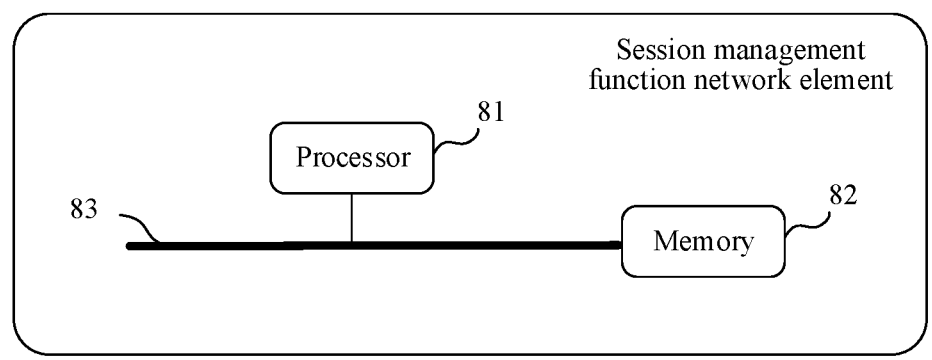
FIG. 17 is a schematic structural diagram of a session management function network element according to this application.

FIG. 17 is a schematic structural diagram of a session management function network element according to this application. Referring to FIG. 17, the session management function network element includes a processor 81, a memory 82, and a communications bus 83, where the communications bus 83 is configured to implement a connection between components, the memory 82 is configured to store a program instruction, and the processor 81 is configured to: read the program instruction in the memory 82, and perform the methods shown in the embodiments of FIG. 7 and FIG. 8 according to the program instruction in the memory 82. Optionally, the processor 81 can perform other processes of the session management function network element other than information transceiving in the embodiments of FIG. 7 and FIG. 8. The implementation principles and beneficial effects thereof are similar, and details are not described herein again.

This application provides a computer readable storage medium. The computer readable storage medium stores a computer executable instruction, and when at least one processor of a storage device executes the computer executable instruction, the storage device performs the data reading method provided in the foregoing possible designs.

This application provides a computer program product. The computer program product includes a computer executable instruction, and the computer executable instruction is stored in a computer readable storage medium. At least one processor of a storage device can read the computer executable instruction from the computer readable storage medium. The at least one processor executes the computer executable instruction, so that the storage device performs the data reading method provided in the foregoing possible designs in the foregoing method embodiments.

This application provides a chip system. The chip system includes a processor, configured to support a data sending device in implementing functions in the foregoing aspects, for example, generating or processing data and/or information in the foregoing methods. In a possible design, the chip system further includes a memory. The memory is configured to store a program instruction and data necessary to a data sending device. The chip system may include a chip, or may include a chip and another discrete device.

Persons of ordinary skill in the art may understand that all or some of the steps of the method embodiments may be implemented by a program instructing related hardware. The program may be stored in a computer readable storage medium. When the program is executed, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the embodiments of the present invention, but not for limiting the present invention. Although the embodiments of the present invention are described in detail with reference to the foregoing embodiments, persons of ordinary skill in the art should understand that they may still make modifications to the technical solutions described in the foregoing embodiments or make equivalent replacements to some or all technical features thereof, without departing from the scope of the solutions of the embodiments of the present invention.

What is claimed is:

1. A session processing method, comprising:
   determining, by a processor, that a first application is not associated with at least one session parameter of a plurality of session parameters of a first session when starting the first application, wherein the first session is pre-existing prior to starting the first application; and
   transmitting data of the first application through the first session in response to obtaining indication information rather than establishing a second session for the first application,
   wherein
     the indication information indicates that the first session is to be used for transmitting the data of the first application, and
     the indication information is generated in response to:
       a determination that a first session parameter of the plurality session parameters of the first session is not identical to a first session parameter requirement of a plurality of session requirements of the first application,
       a determination that the first session parameter of the first session, though not identical to the first session parameter requirement of the first application, can satisfy the first session parameter requirement of the first application; and
       a determination that a second session parameter of the first session is identical to a second session parameter requirement of the first application.

2. The method according to claim 1, wherein transmitting the data of the first application comprises:
   when the first session parameter of the first session is a network slice identifier of the first session, transmitting the data of the first application by using a network slice corresponding to the network slice identifier of the first session.

3. The method according to claim 1, wherein transmitting the data of the first application comprises:
   when the first session parameter of the first session is a data network identifier of the first session, transmitting the data of the first application by using a data network corresponding to the data network identifier of the first session.

4. The method according to claim 1, wherein transmitting the data of the first application comprises:
   when the first session parameter of the first session is a service and session continuity mode, transmitting the data of the first application based on the session continuity mode of the first session.

5. A session processing apparatus, comprising:
   a processor configured to determine that a first application is not associated with at least one session parameter of a plurality of session parameters of a first session when a terminal device starts the first application, wherein the first session is pre-existing prior to starting the first application; and
   a transmitter configured to transmit data of the first application through the first session in response to the terminal device obtaining indication information rather than establishing a second session for the first application,
   wherein
     the indication information indicates that the first session is to be used for transmitting the data of the first application, and
     the indication information is generated in response to:
       a determination that a first session parameter of the plurality session parameters of the first session is not identical to a first session parameter requirement of a plurality of session requirements of the first application,
       a determination that the first session parameter of the first session, though not identical to the first session parameter requirement of the first application, can satisfy the first session parameter requirement of the first application; and
       a determination that a second session parameter of the first session is identical to a second session parameter requirement of the first application.

6. The apparatus according to claim 5, wherein
   when the first session parameter of the first session is a network slice identifier of the first session, the transmitter is configured to transmit the data of the first application by using a network slice corresponding to the network slice identifier of the first session.

7. The apparatus according to claim 5, wherein
   when the first session parameter of the first session is a data network identifier of the first session, the transmitter is configured to transmit the data of the first application by using a data network corresponding to the data network identifier of the first session.

8. The apparatus according to claim 5, wherein
   when the first session parameter of the first session is a service and session continuity mode of the first session, the transmitter is configured to transmit the data of the first application based on a session continuity mode of the first session.

9. The apparatus according to claim 5, wherein the apparatus is the terminal device.

10. A non-transitory computer readable medium having computer readable instructions stored thereon that, when executed by a processor, cause an apparatus to:
    determine that a first application is not associated with at least one session parameter of a plurality of session parameters of a first session when starting the first application, wherein the first session is pre-existing prior to starting the first application; and
    transmit data of the first application through the first session in response to obtaining indication information rather than establishing a second session for the first application,
    wherein
      the indication information indicates that the first session is to be used for transmitting the data of the first application, and
      the indication information is generated in response to:
        a determination that a first session parameter of the plurality session parameters of the first session is not identical to a first session parameter requirement of a plurality of session requirements of the first application,
        a determination that the first session parameter of the first session, though not identical to the first session parameter requirement of the first application, can satisfy the first session parameter requirement of the first application; and a determination that a second session parameter of the first session is identical to a second session parameter requirement of the first application.

11. The non-transitory computer readable medium according to claim 10, wherein when first the session parameter of the first session is a network slice identifier of the first session, the apparatus is caused to transmit the data of the first application by using a network slice corresponding to the network slice identifier of the first session.

12. The non-transitory computer readable medium according to claim 10, wherein when first the session parameter of the first session is a data network identifier of the first session, the apparatus is caused to transmit the data of the first application by using a data network corresponding to the data network identifier of the first session.

13. The non-transitory computer readable medium according to claim 10, wherein when first the session parameter of the first session is a service and session continuity mode, the apparatus is caused to transmit the data of the first application based on the session continuity mode of the first session.

* * * * *